(12) United States Patent
Boudry et al.

(10) Patent No.: US 11,692,658 B2
(45) Date of Patent: Jul. 4, 2023

(54) COUPLINGS

(71) Applicant: Franklin Fueling Systems Limited, Ipswich (GB)

(72) Inventors: John Alexandre Boudry, Brettenham (GB); Jan Ageheim, Ipswich (GB)

(73) Assignee: Franklin Fueling Systems Limited, Ipswich (GB)

( * ) Notice: Subject to any disclaimer, the term of this patent is extended or adjusted under 35 U.S.C. 154(b) by 471 days.

(21) Appl. No.: 16/382,615

(22) Filed: Apr. 12, 2019

(65) Prior Publication Data
US 2019/0353291 A1 Nov. 21, 2019

Related U.S. Application Data

(63) Continuation of application No. 13/259,379, filed as application No. PCT/GB2010/050512 on Mar. 25, 2010, now Pat. No. 10,274,120.

(30) Foreign Application Priority Data

Mar. 26, 2009 (GB) .................................. 0905203
May 11, 2009 (GB) .................................. 0908046
Dec. 7, 2009 (GB) .................................. 0921382

(51) Int. Cl.
*F16L 39/00* (2006.01)
*F16L 47/03* (2006.01)
(Continued)

(52) U.S. Cl.
CPC ........ *F16L 39/005* (2013.01); *B29C 65/3432* (2013.01); *B29C 66/1122* (2013.01);
(Continued)

(58) Field of Classification Search
CPC ..... F16L 39/005; F16L 27/0849; F16L 47/03; F16L 39/00; F16L 37/00; F16L 47/00;
(Continued)

(56) References Cited

U.S. PATENT DOCUMENTS 5,890,747 A  4/1999  Brockhage
6,231,087 B1 *  5/2001  Ziu ....................... F16L 39/005
                                                  285/133.11
(Continued)

FOREIGN PATENT DOCUMENTS

EP  1004810 A2 *  5/2000 ....... B29C 66/12821
EP  1062454 A1 * 12/2000 ........... B29C 66/636
(Continued)

OTHER PUBLICATIONS

English translation of Office Action dated Aug. 29, 2014 In corresponding Chinese Application No. 201080013304.1, 7 pages.
English translation of Office Action dated Apr. 1, 2015 in corresponding Chinese Application No. 201080013304.1, 4 pages.
Office Action dated Jan. 6, 2016 in corresponding Canadian Application No. 2,754,289, 4 pages.
English translation of the Office Action dated May 2, 2017 in corresponding Chinese Application No. 201610099012.3, 12 pages.

*Primary Examiner* — James M Hewitt, II
(74) *Attorney, Agent, or Firm* — Faegre Drinker Biddle & Reath LLP

(57) ABSTRACT

A coupling component having a first end and a second end, the fitting having a longitudinal axis between the first end and the second end, the first end of the component including a first tubular portion having a first internal diameter adapted to form a sliding fit with a first pipe section, and a first sealer adapted such that the first end can be sealed in use to the first pipe section; the second end having a second diameter or cross-sectional area which is larger than the first diameter and wherein the second end incorporates a flange, wherein at least part of the face of said flange is in a plane substantially non-perpendicular to, or offset from, the longitudinal axis of the component.

17 Claims, 31 Drawing Sheets

(51) Int. Cl.
  *F16L 27/08* (2006.01)
  *B29C 65/34* (2006.01)
  *B29C 65/00* (2006.01)

(52) U.S. Cl.
  CPC .... *B29C 66/12441* (2013.01); *B29C 66/1312* (2013.01); *B29C 66/5221* (2013.01); *B29C 66/52231* (2013.01); *B29C 66/52241* (2013.01); *B29C 66/52298* (2013.01); *B29C 66/543* (2013.01); *B29C 66/54741* (2013.01); *B29C 66/72523* (2013.01); *F16L 27/0849* (2013.01); *F16L 47/03* (2013.01); *B29C 65/3468* (2013.01); *B29C 66/71* (2013.01)

(58) Field of Classification Search
  CPC .. F16L 47/02; B29C 65/3432; B29C 66/1122; B29C 66/12441; B29C 66/1312; B29C 66/5221; B29C 66/52231; B29C 66/52241; B29C 66/52298; B29C 66/543; B29C 66/54741; B29C 66/72523
  See application file for complete search history.

(56) References Cited

U.S. PATENT DOCUMENTS

| | | | |
|---|---|---|---|
| 8,485,561 B2 * | 7/2013 | Guo | F16L 25/14 |
| | | | 285/133.11 |
| 8,973,872 B2 * | 3/2015 | Haug | B29D 23/008 |
| | | | 244/135 R |

FOREIGN PATENT DOCUMENTS

| | | | | |
|---|---|---|---|---|
| EP | 1927806 | | 11/2007 | |
| GB | 2382392 A | * | 5/2003 | ....... B29C 66/52298 |
| JP | 2005299827 A | * | 10/2005 | ......... B29C 66/1224 |
| WO | WO-9822742 A1 | * | 5/1998 | ............ F16L 39/005 |
| WO | 2006/027535 | | 3/2006 | |

* cited by examiner

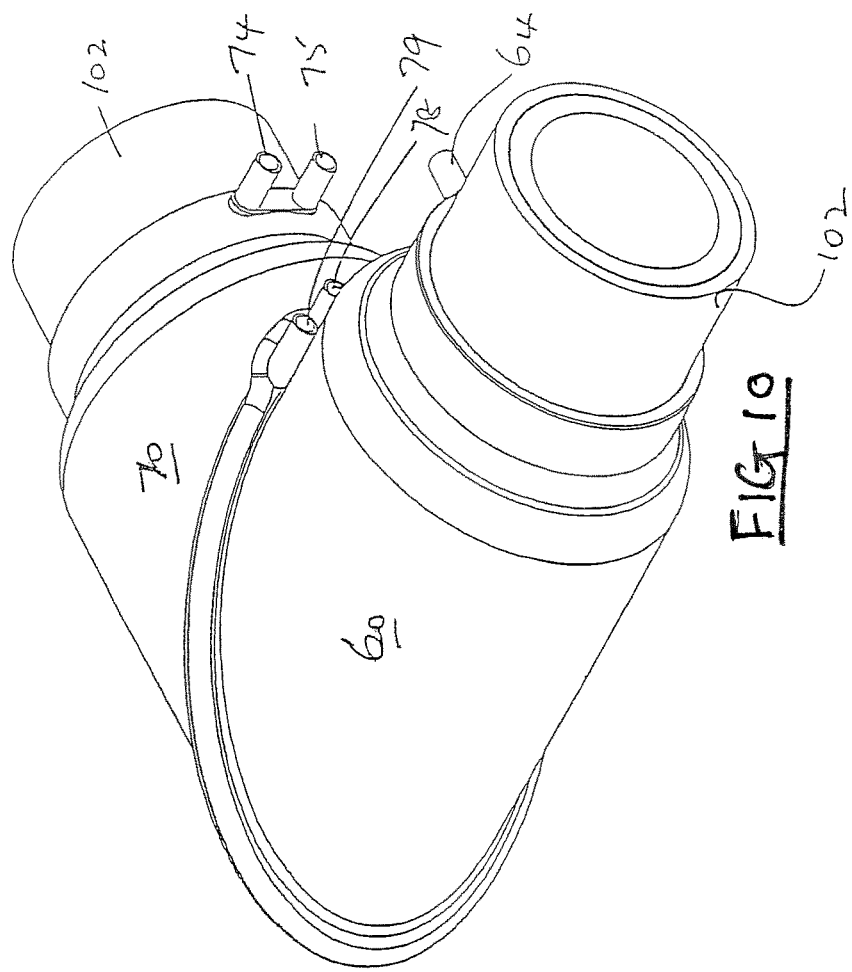
FIG 10
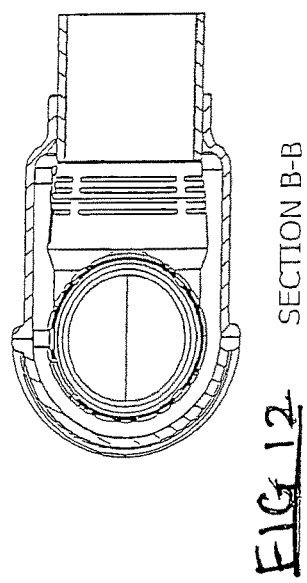
FIG 12 SECTION B-B
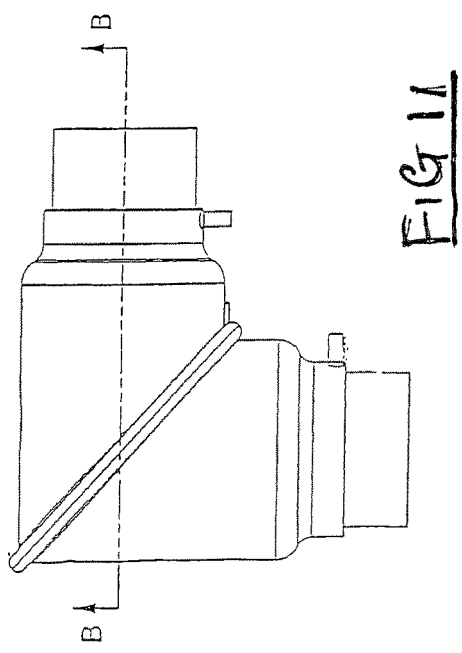
FIG 11

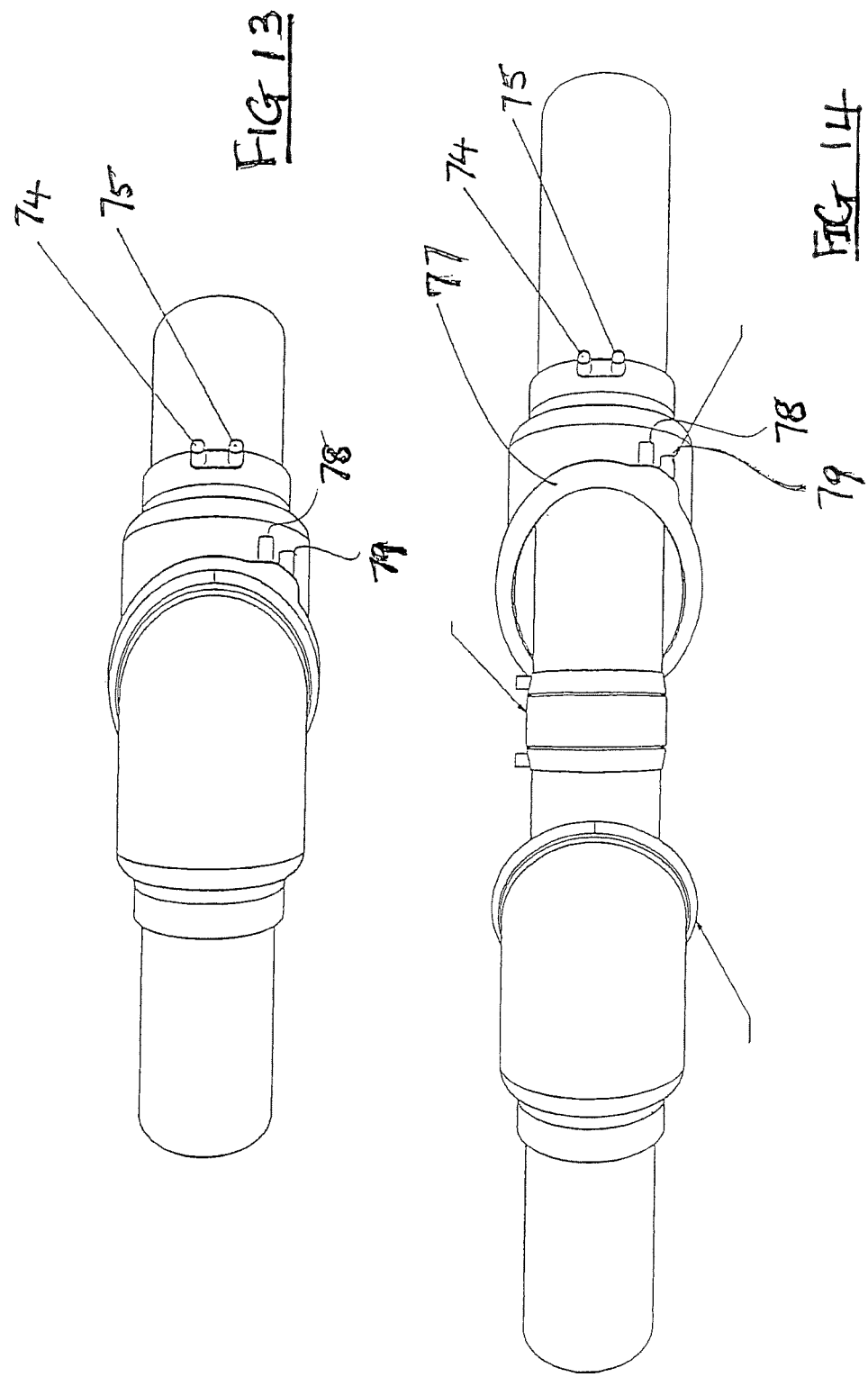

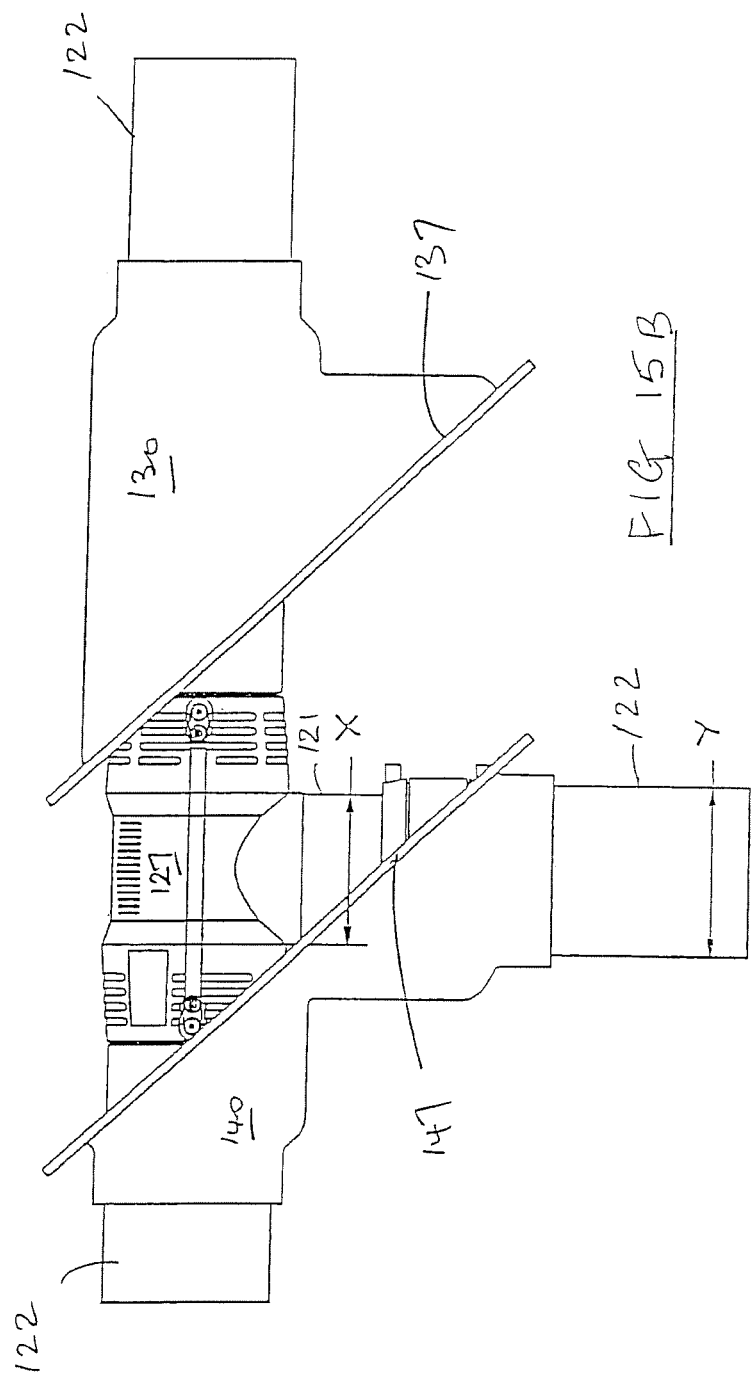

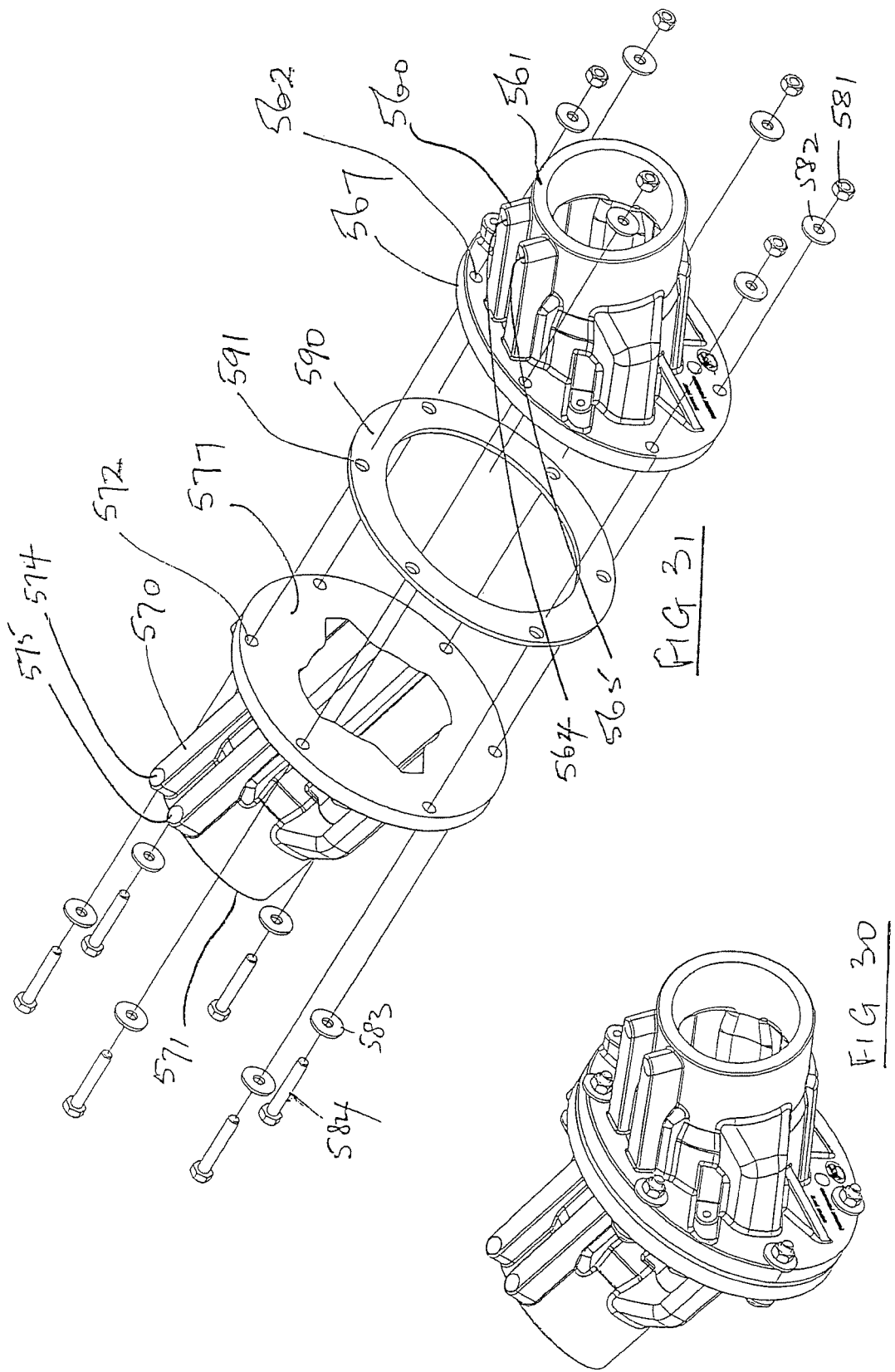

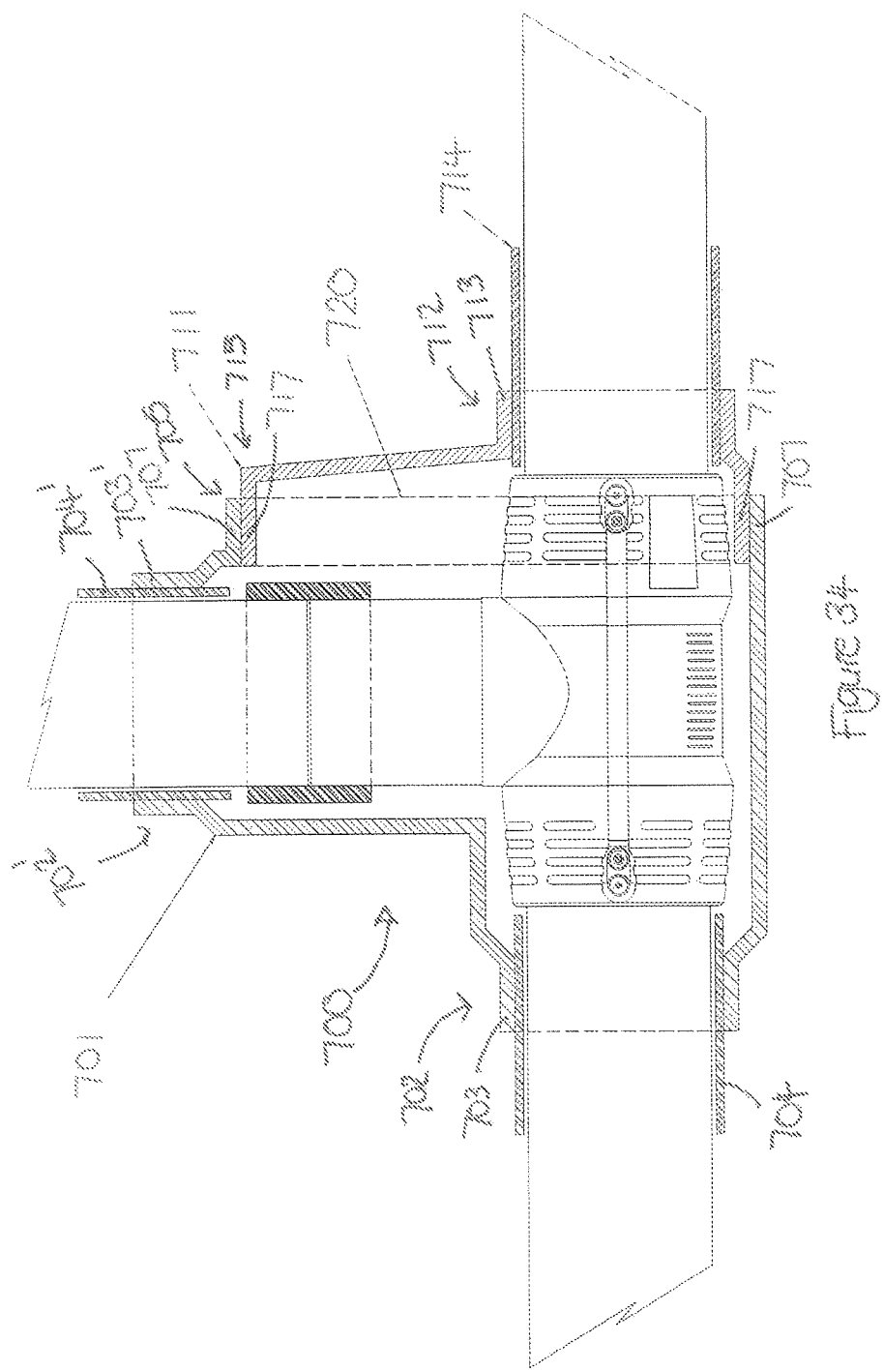

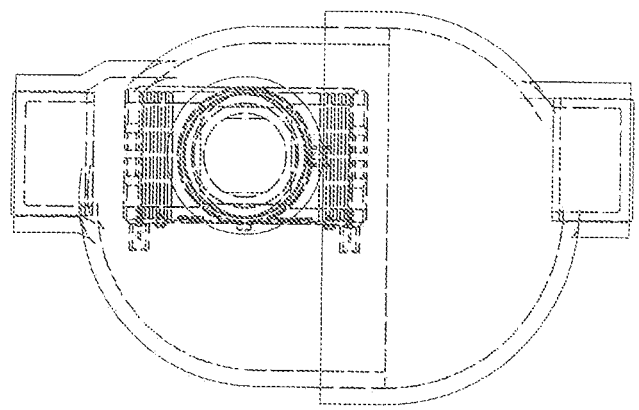
Figure 35C  ↖ 800
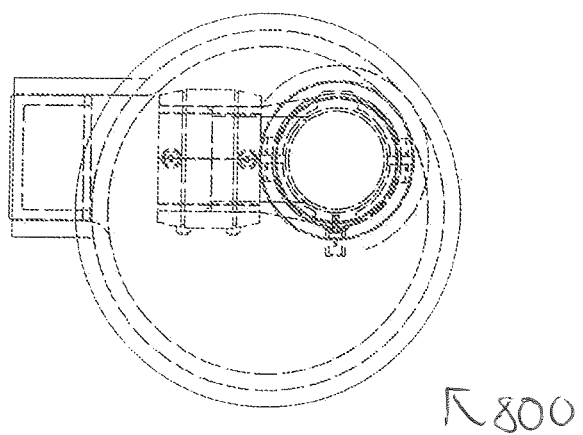
Figure 35D  ↖ 800

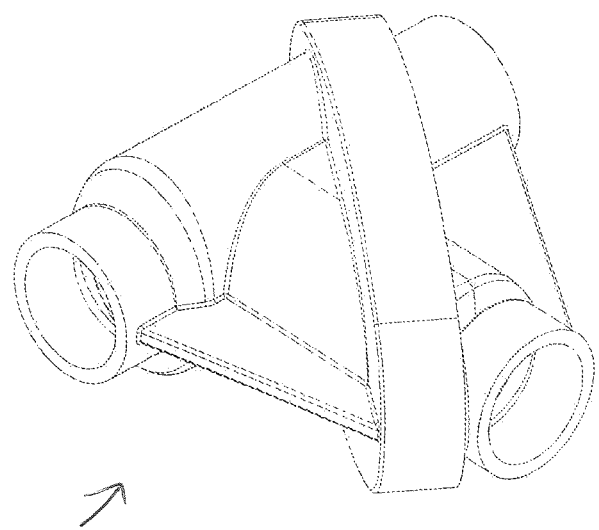
950 Figure 37A
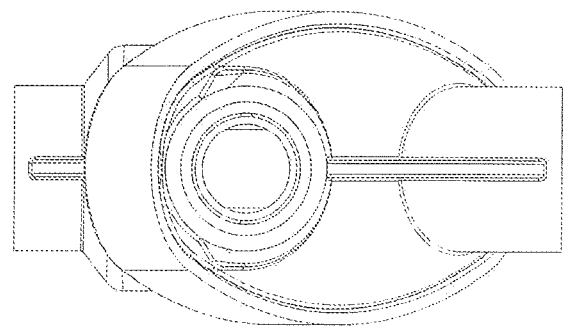
950 Figure 37B

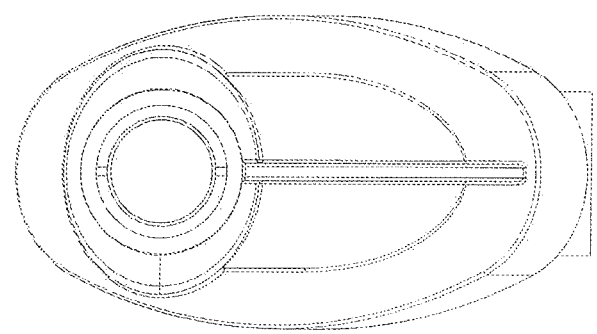
950  Figure 37C
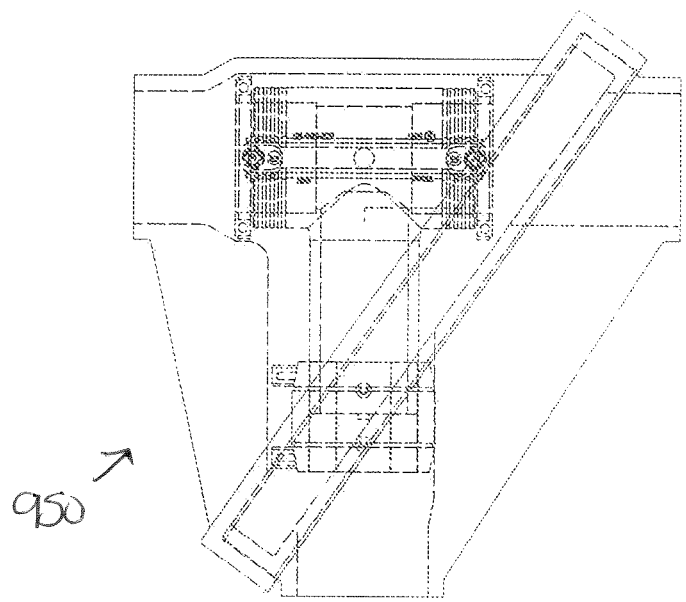
950  Figure 37D

COUPLINGS

CROSS-REFERENCE TO RELATED APPLICATION

This application is a continuation of U.S. patent application Ser. No. 13/259,379, filed Nov. 16, 2011 and issued as U.S. Pat. No. 10,274,120 on Apr. 30, 2019, which is related to and claims the benefit under 35 U.S.C. § 119 and 35 U.S.C. § 365 of International Application No. PCT/GB2010/050512, filed Mar. 25, 2010, which claims priority to GB 0905203.6, filed Mar. 26, 2009, GB 0908046.6, filed May 11, 2009 and GB 0921382.8, filed Dec. 7, 2009, the disclosures of which are expressly incorporated herein by reference.

FIELD OF THE INVENTION

The present invention relates to a method and apparatus for joining together lengths of pipe. It is particularly applicable, but in no way limited, to a method and apparatus for joining together lengths of secondarily contained plastic pipe including elbows, T connections and other junctions.

BACKGROUND TO THE INVENTION

Pipes made of plastics material are used extensively in industry and in construction. Many applications now use pipes made from plastics materials such as polyethylene and polypropylene rather than metal. One such application is the pipework used in petroleum installations such as garage forecourts.

In the design of petroleum forecourt installations for example, it is regarded as increasingly important to contain and detect any leaks of petroleum or diesel fuel from subterranean pipes that connect one or more storage tanks to dispensing pumps in the installation. To that end, many current designs of forecourt installation utilise secondary containment. This involves containing each supply pipeline in a respective secondary containment pipeline that is optionally sealed at its ends to the fuel supply pipelines. The secondary containment pipeline prevents leaks from the fuel supply pipeline from being discharged into the environment, at the same time providing the facility to convey any leaked petrol to a remote sensing device, and allows the use of leak monitoring equipment.

Whilst every effort is made to avoid having joints in an underground supply pipeline, other than inside manhole chambers and sumps, these joints sometimes cannot be avoided. Such joints are conventionally made using special fittings and the connections are made using a chemical-based jointing compound or by electrofusion welding. Whilst the latter technique is preferred in many applications, it will be appreciated that any conventional or yet to be discovered methods for joining plastics components can be used to join the various parts of the coupling components and coupling assemblies together, including the use of bolt and gasket type methods. Whilst the techniques and components of the present invention will be described mainly in relation to electrofusion coupling components and electrofusion coupling assemblies, the present invention applies and works equally well with non-electrofusion coupling components, assemblies and techniques for joining the various plastics components together.

In conventional single containment plastic piping systems, successive lengths of plastic pipe are joined end to end using so-called electrofusion couplings or welding muffs, which typically comprise short plastic sleeves providing sockets at either end having internal diameters of a size to receive the ends of the respective pipes as a close sliding fit and incorporating electrical resistance heating windings. Thus two adjoining pipe lengths can be connected end to end by inserting the adjoining pipe ends into such an electrofusion coupler from opposite ends thereafter passing electric current through the heating windings in order to fuse the internal surfaces of the electrofusion coupling and the adjacent external surfaces of the inserted pipe ends, thereby welding the pipe ends to the electrofusion coupling to form a fluid tight joint.

Conventional electrofusion couplings require at least two electrical terminal connections on their outer surface. These electrical connectors, which are typically in the form of strong, metal terminal pins surrounded by a plastic shroud, are required in order to connect the connector fitting to an electrofusion welding machine. These electrical connectors therefore project significantly proud of the surface of the main body of the electrofusion coupling. Furthermore, the body of the electrofusion coupling itself has a finite thickness. The walls of these couplings have to be relatively thick, at least as thick as the walls of the pipe they are designed to join. It is important that these electrofusion couplings do not distort during the electrofusion process. It will also be understood that the electrofusion couplings fit over the outside of the pipe sections they are designed to join. As a consequence of the external location of the electrofusion coupling, the thickness of the body of the electrofusion coupling itself, and the projecting electrical connectors, the effective external diameter of the pipework in the region of the coupling is significantly greater than the external diameter of the pipe itself.

When these joins are made in a primary pipeline, this presents a problem regarding sizing the associated secondary pipe. One solution is to size the secondary pipe such that its internal diameter is large enough to accommodate the electrofusion fitting(s) joining the primary pipe. This solution provides for the minimum number of electrofusion joints required in the secondary pipework but is costly in materials in that a secondary pipe of a significantly larger diameter is used than would be necessary to enclose a primary pipe free from any joints.

A further solution is to use a secondary pipe that is a snug fit around the primary pipe and then use a series of expanders and reducers to increase the effective internal diameter of the secondary pipe in the region of any primary pipework joints. This solution has a number of inherent problems. For example, it will be appreciated that it is desirable to keep the number of such joints to a minimum. A minimum of four separate electrofusion joints are needed in this type of solution. This solution is also expensive in the number of separate components required. In addition, it is desirable if the various components of the secondary coupling are kept out of the way, whilst being in their correct relative positions, whilst the primary pipework is joined and tested. This can be difficult in on-site conditions.

In an attempt to reduce the number of components associated with a secondary containment joint and simplify the installation of the joint, the use of a coupler that is able to join secondary containment pipe sections together in a single welding step has been proposed in EP1,062,454 B1 and EP1,004,810 B1. Both documents disclose a joint for a secondary containment section. The joint comprises a single walled body comprising a seat on its internal surface as well as a channel passing there through. The arrangement of the seat on the inner surface of the body means that both the inner and outer pipes of the secondary containment pipe sections can be secured in position to the inner surfaces of the body by electrofusion welding. The presence of the channel within the body means that the continuity of the interstitial space between the separate secondary contained pipe sections is maintained along the length of the pipe as a whole and through the joints. Although pipe joints of this type facilitate the union of secondary containment pipe sections in a quick and simple manner, without the need for reducers, the single walled nature of the joint means that if any rupture or failure should occur within the walls of the joint, leakage of fluid contained within the pipe system will inevitably occur due to the single walled nature of the joint.

A further major disadvantage of this type of fitting is that they do not allow for the primary pipes to be joined and tested before the secondary pipe joints are made.

A further type of electrofusion fitting intended to accommodate both primary and secondary pipes is described in EP1,787,055 (Glynwed Pipe Systems Ltd). The complex shaped fittings described therein are both expensive to manufacture because of their intricate design and still require expansion/reduction fittings to complete the sealing assembly around the secondary pipework.

There is therefore a need for a simple, easy to manufacture coupling for use around a conventional primary pipe coupling, elbow or T.

SUMMARY OF THE INVENTION

According to a first aspect of the present invention there is provided a coupling component having a first end and a second end, said fitting having a longitudinal axis between the first end and the second end, the first end of the component including a first tubular portion having a first internal diameter adapted to form a sliding fit with a first pipe section, and a first sealing means adapted such that the first end can be sealed in use to the first pipe section; the second end having a second diameter or cross-sectional area which is larger than the first diameter and wherein the second end includes an end face, wherein the end face is in a plane substantially non-perpendicular to, or offset from, the longitudinal axis of the component and wherein the second end further includes a mating region. Two of these components can be used to form a join in secondary pipe and can be slid out of the way whilst a similar joint in the primary pipe is made and tested.

Preferably the mating region includes a flange.

Preferably the mating region extends from the end face.

The flange may extend radially from the plane of the end face to define an annular portion or ring. In this alternative the end face may include both the mating region and therefore the flange such that the flange is an extension of the end face and the end face is the flange which mates with a flange of another component. The face of the flanges of two components will then be able to be brought together to form the connection. This alternative is also beneficial as the two components formed in one alternative may be identical mirror images, meaning that only one mould would be required to form both components needed to form the coupling.

In an alternative the flange may extend axially from the plane of the end face to define a cylindrical portion or ring. In this alternative one coupling component will have a flange which defines a socket and the other coupling component will have a flange which defines a spigot. The socket flange cylindrical portion being of a larger diameter compared to the spigot flange cylindrical portion such that when the two components are brought together to form the coupling the spigot flange portion is a tight sliding fit inside the socket flange portion. It may be that the socket and the spigot are single flanges or it may be that the socket is a double flange and the spigot is a tight sliding fit inside the double flange. It may also be that the socket flange and the spigot flange are not perpendicularly radially extending from the end face but may be complimentary angled in a conical or tapered arrangement such that the spigot flange is easily lined up with and located within the socket flange. This alternative is also beneficial as the two components have an integrated way of connecting the two components and will stay in position without the need for clamps in the same way as would be needed in the face to face radial flanges described above.

Preferably the coupling component further includes a second sealing means adapted to seal in use the coupling component to some other coupling component.

Preferably the end face at the second end of the component is in a plane at substantially 45° to the longitudinal axis of the component. However, it will be understood that this angle can be varied by the designer depending on the desired angle between the pipes to be joined, and/or the space required within the fitting to make and test the joint in the primary pipework. For example, if a 45° angle is required between the pipes being joined, then the end faces will be at an angle of 22.5° to a plane perpendicular to the longitudinal axis of the component.

Furthermore, the angle of the end face on the two mating components need not be identical. Providing the sum of these angles adds up to the desired angle between the two pipes being joined, then the objective of the coupling components and coupling assembly has been achieved.

Preferably the component is generally tubular in configuration.

Preferably the diameter, internal diameter or internal cross-sectional area of the second end is larger than the diameter of the first end. This provides space to accommodate a fitting around the primary pipe.

Preferably the first end is in a plane substantially perpendicular to the longitudinal axis of the component.

In a further preferred embodiment the component further includes a third end, the third end of the component including a further tubular portion having an internal diameter adapted to form a sliding fit with a pipe section, the component further including a third sealing means adapted such that the third end can be sealed in use to a third pipe section. This arrangement provides for a T-fitting.

Preferably the second end is non-circular in cross-section and more preferably the second end is substantially oval in shape.

The term "sealing means" is intended to cover all known and yet-to-be-discovered methods of sealing plastics materials together. It includes heat welding using both internal and external heating sources, integral and separate heating elements, sonic welding, friction welding, chemical welding and adhesives. This list is not intended to be exhaustive, but rather to illustrate the very wide range of methods that can be used to seal/join the coupling components one to another and to seal the coupling components to the pipes being joined.

Preferably the sealing means is selected from the group including:—
(i) an electrofusion heating element and associated electrical terminal connections;
(ii) A bond or weld including a chemical bond or weld, an ultrasonic weld or a heat weld;

(iii) a gasket seal together with a clamping means such as a plurality of bolts; or a combination thereof.

According to a second aspect of the present invention there is provided a coupling assembly including two coupling components as defined in the present invention, the components being sealed together mating region to mating region such that the end faces of the two coupling components are substantially parallel in use.

Preferably the mating region includes a flange.

Preferably the mating region extends from the end face.

The flange may extend radially from the plane of the end face to define an annular portion or ring. In this alternative the end face may include both the mating region and therefore the flange such that the flange is an extension of the end face and the end face is the flange which mates with a flange of another component. The face of the flanges of two components will then be able to be brought together to form the connection. This alternative is also beneficial as the two components formed in one alternative may be identical mirror images, meaning that only one mould would be required to form both components needed to form the coupling.

In an alternative the flange may extend axially from the plane of the end face to define a cylindrical portion or ring. In this alternative one coupling component will have a flange which defines a socket and the other coupling component will have a flange which defines a spigot. The socket flange cylindrical portion being of a larger diameter compared to the spigot flange cylindrical portion such that when the two components are brought together to form the coupling the spigot flange portion is a tight sliding fit inside the socket flange portion. It may be that the socket and the spigot are single flanges or it may be that the socket is a double flange and the spigot is a tight sliding fit inside the double flange. It may also be that the socket flange and the spigot flange are not perpendicularly radially extending from the end face but may be complimentary angled in a conical or tapered arrangement such that the spigot flange is easily lined up with and located within the socket flange. This alternative is also beneficial as the two components have an integrated way of connecting the two components and will stay in position without the need for clamps in the same way as would be needed in the face to face radial flanges described above.

Preferably the mating region on one of the components includes an electrofusion heating element and electrical terminal connections. In the alternative wherein the mating region is a flange which extends radially in the plane of the end face the electrofusion heating element is located in the face of the flange. In the alternative wherein the mating region is a flange which extends axially in the plane of the end face such that one coupling component will have a flange which defines a socket and the other coupling component will have a flange which defines a spigot, the electrofusion heating element is located either in the internal flange surface of the socket or in the external flange surface of the spigot.

Preferably the end face at the second end of each component is in a plane at substantially 45° to the longitudinal axis of the component, such that the two components are adapted to mate together with substantially parallel end faces at both 90° and 180°.

Preferably a first coupling component having a first end and a second end including an end face and a mating region and a second coupling component having a first end, a second end including an end face and a mating region and a third end, the resultant coupling forming a T.

Preferably the angle and location of the respective end faces provides access for making a T-joint in a primary pipe assembly within the coupling assembly prior to opposing end faces on the coupling assembly together.

Preferably the end faces, of the two components are non-planar in that each end face includes a first end face portion and a second end face portion, the two end face portions being angled with respect to each other.

Preferably the angle between the two end face portions is substantially 90°.

Preferably the coupling assembly comprises a third coupling component, this third component including a tubular portion at one end having an internal diameter adapted to form a sliding fit with a pipe section and a sealing means such that the end can be sealed in use to a pipe section, the third component further including an end face and a mating region, the mating region being adapted to seal in use to mating regions on the other two components, and preferably the end face on the third component is substantially planar.

Preferably the end face on the third component includes a first end face portion and a second end face portion, the two end face portions being angled with respect to each other.

Preferably the first and second end face portions on the third coupling component are angled at substantially 90° to each other.

Preferably the coupling assembly includes two coupling components as defined in the present invention and further includes a third coupling component having a first end including a tubular portion having an internal diameter adapted to form a sliding fit with a third pipe section and a second end having an end face and a mating region, said coupling assembly further including a fourth component which has three end faces and mating regions, each of these three mating regions being so sized, shaped and orientated as to mate with and form a substantially fluid-tight seal with the respective mating regions on the other three components.

Preferably the sealing means comprise an electrofusion heating element(s) and associated electrical terminal connections.

According to a third aspect of the present invention there is provided an electrofusion coupling component having a first end and a second end, said fitting having a longitudinal axis between the first end and the second end, the first end of the component including a first tubular portion having a first internal diameter adapted to form a sliding fit with a first pipe section, the first end further including an electrofusion heating element and electrical terminal connections such that the first end can be electrofused in use to said first pipe section; the second end having a second internal diameter or internal cross-sectional area which is larger than the first internal diameter and wherein the second end includes an end face, wherein the end face is in a plane substantially non-perpendicular to, or offset from, the longitudinal axis of the component and wherein the second end further includes a mating region. This arrangement makes it possible for two fittings to be used together as an electrofusion coupling to form a bend or to form a linear coupling whose internal capacity is large enough to accommodate a primary pipe coupling without the need for any other expansion/reduction fittings.

Preferably the mating region includes a flange.

Preferably the mating region extends from the end face.

The flange may extend radially from the plane of the end face to define an annular portion or ring. In this alternative the end face may include both the mating region and therefore the flange such that the flange is an extension of the end face and the end face is the flange which mates with a flange of another component. The face of the flanges of two components will then be able to be brought together to form the connection. This alternative is also beneficial as the two components formed in one alternative may be identical mirror images, meaning that only one mould would be required to form both components needed to form the coupling.

In an alternative the flange may extend axially from the plane of the end face to define a cylindrical portion or ring. In this alternative one coupling component will have a flange which defines a socket and the other coupling component will have a flange which defines a spigot. The socket flange cylindrical portion being of a larger diameter compared to the spigot flange cylindrical portion such that when the two components are brought together to form the coupling the spigot flange portion is a tight sliding fit inside the socket flange portion. It may be that the socket and the spigot are single flanges or it may be that the socket is a double flange and the spigot is a tight sliding fit inside the double flange. It may also be that the socket flange and the spigot flange are not perpendicularly radially extending from the end face but may be complimentary angled in a conical or tapered arrangement such that the spigot flange is easily lined up with and located within the socket flange. This alternative is also beneficial as the two components have an integrated way of connecting the two components and will stay in position without the need for clamps in the same way as would be needed in the face to face radial flanges described above.

Preferably the mating region at the second end of the component includes an electrofusion heating element and electrical terminal connections. This enables one component containing an electrofusion heating element to be used in combination with a further component without such an element to form an electrofusion coupling. This is an important feature of the invention in that only one side of a pair of mating regions should contain an electrofusion heating element. However, it will be appreciated that where a mating region is non-planar and thus formed from two or more mating regions portions which meet at an angle other than a right angle, only one of the mating region portions may include an electrofusion heating element rather than the entire mating region.

In the alternative wherein the mating region is a flange which extends radially in the plane of the end face the electrofusion heating element is located in the face of the flange. In the alternative wherein the mating region is a flange which extends axially in the plane of the end face such that one coupling component will have a flange which defines a socket and the other coupling component will have a flange which defines a spigot, the electrofusion heating element is located either in the internal flange surface of the socket or in the external flange surface of the spigot.

Preferably end face at the second end of the component is in a plane at substantially 45° to the longitudinal axis of the component. The use of two 45° components provides for a 0° to 90° bend, a 0° bend being an in-line connection.

In a further preferred embodiment the end face is in a plane at substantially 22.5° to the longitudinal axis. Two such components then provide a 45° bend. It will be understood that any other suitable angle between 0° and 90° can be used as desired to give an appropriate angle of bend.

Preferably the component is generally tubular in configuration. It will be understood that the end faces of complementary fittings are designed such that two such components can mate together to give the desired angle of bend, or in-line connection.

Preferably the internal diameter or the internal cross-sectional area of the second end is larger than the diameter of the first end, thus allowing space within the assembled coupling for other welding sockets.

Preferably the first end is in a plane substantially perpendicular to the longitudinal axis of the component. This form is the typical form for the end of a welding socket.

Preferably the component further includes a third end, the third end of the component including a further tubular portion having an internal diameter adapted to form a sliding fit with a pipe section, the third end further including an electrofusion heating element and electrical terminal connections such that the third end can be electrofused in use to said third pipe section. This combination of components can be used to form a T-joint.

Preferably the second end is non-circular in cross-section and more preferably the second end is substantially oval in shape.

According to a fourth aspect of the present invention there is provided an electrofusion coupling assembly including two electrofusion coupling components as defined in the present invention, the components being designed to be bonded together mating region to mating region such that the end faces of the two coupling components are substantially parallel in use.

Preferably the mating region includes a flange.

Preferably the mating region extends from the end face.

The flange may extend radially from the plane of the end face to define an annular portion or ring. In this alternative the end face may include both the mating region and therefore the flange such that the flange is an extension of the end face and the end face is the flange which mates with a flange of another component. The face of the flanges of two components will then be able to be brought together to form the connection. This alternative is also beneficial as the two components formed in one alternative may be identical mirror images, meaning that only one mould would be required to form both components needed to form the coupling.

In an alternative the flange may extend axially from the plane of the end face to define a cylindrical portion or ring. In this alternative one coupling component will have a flange which defines a socket and the other coupling component will have a flange which defines a spigot. The socket flange cylindrical portion being of a larger diameter compared to the spigot flange cylindrical portion such that when the two components are brought together to form the coupling the spigot flange portion is a tight sliding fit inside the socket flange portion. It may be that the socket and the spigot are single flanges or it may be that the socket is a double flange and the spigot is a tight sliding fit inside the double flange. It may also be that the socket flange and the spigot flange are not perpendicularly radially extending from the end face but may be complimentary angled in a conical or tapered arrangement such that the spigot flange is easily lined up with and located within the socket flange. This alternative is also beneficial as the two components have an integrated way of connecting the two components and will stay in position without the need for clamps in the same way as would be needed in the face to face radial flanges described above.

Preferably the mating region on one of the components includes an electrofusion heating element and electrical terminal connections. In the alternative wherein the mating region is a flange which extends radially in the plane of the end face the electrofusion heating element is located in the face of the flange. In the alternative wherein the mating region is a flange which extends axially in the plane of the end face such that one coupling component will have a flange which defines a socket and the other coupling component will have a flange which defines a spigot, the electrofusion heating element is located either in the internal flange surface of the socket or in the external flange surface of the spigot.

Preferably the end face at the second end of the component is in a plane greater than 0° and less than 90° to the longitudinal axis of the component.

More preferably the end face at the second end of each component is in a plane at substantially 45° to the longitudinal axis of the component, such that the two components mate together at both 45° and 180°.

Preferably the electrofusion coupling assembly includes a first coupling component having a first end and a second end including an end face and a mating region and a second coupling component having a first end, a second end including an end face and a mating region and a third end, the resultant coupling forming a T.

Preferably the angle and location of the respective end faces provides access for making a T-joint in a primary pipe assembly within the electrofusion coupling assembly prior to electrofusing opposing mating regions on the coupling assembly.

In an alternative preferred embodiment the end faces of the two components are non-planar in that each end face includes a first end face portion and a second end face portion, the two end face portions being angled with respect to each other.

In an alternative preferred embodiment the mating regions of the two components are non-planar in that each mating region includes a first mating region portion and a second mating region portion, the two mating region portions being angled with respect to each other.

Preferably the angle between the two end face portions is substantially 90°.

Preferably the angle between the two mating region portions is substantially 90°.

In a preferred embodiment the coupling assembly includes a third electrofusion coupling component, this third component including a tubular portion at one end having an internal diameter adapted to form a sliding fit with a pipe section and an electrofusion heating element and electrical terminal connections such that that end can be electrofused in use to a pipe section, the third component further including at another end an end face and a mating region, the mating region being adapted to electrofuse in use to mating region portions on the other two components.

Preferably the end face on the third component is substantially planar.

Preferably the mating region on the third component is substantially planar.

In an alternative preferred embodiment the end face on the third component includes a first end face portion and a second end face portion, the two end face portions being angled with respect to each other.

In an alternative preferred embodiment the mating region on the third component includes a first mating region portion and a second mating portion, the two mating region portions being angled with respect to each other.

Preferably the first and second end face portions on the third coupling component are angled at substantially 90° to each other.

Preferably the first and second mating region portions on the third coupling component are angled at substantially 90° to each other.

According to a further embodiment of the present invention there is provided an electrofusion coupling assembly including two electrofusion coupling components as defined in the present invention and further including third and fourth electrofusion coupling components, said third electrofusion coupling component having a first end comprising a tubular portion having an internal diameter adapted to form a sliding fit with a third pipe section and a second end including an end face and a mating region, said fourth component having three end faces and mating regions, each of these three mating regions being so sized, shaped and orientated as to mate with and form a substantially fluid-tight electrofusion seal with the respective mating regions on the other three components.

The present invention also extends to methods of manufacturing components and couplings as herein defined and methods of forming pipework systems using such components and couplings, as well as the pipework systems so formed.

BRIEF DESCRIPTION OF THE DRAWINGS

The invention will now be described by way of example only with reference to the accompanying drawings wherein:

FIGS. 10, 11 and 12 show the coupling components of FIGS. 8 and 9 in a closed or welded position;

FIGS. 13 and 14 show the coupling components in a closed and open position respectively forming a linear or in-line joint;

FIGS. 15A to D illustrate an embodiment of the invention applied to a T fitting;

FIGS. 30 and 31 illustrate a coupling in which the sealing means is a bolted gasket seal;

FIG. 34 illustrates a cross section cut away view of a coupling assembly for a T-joint according to a further embodiment of the present invention;

FIGS. 35A to 35D illustrate an alternate construction of T-joint using the same socket and spigot arrangement as in FIG. 34;

FIGS. 37A to 37D illustrate an alternate construction of T-joint using the same socket and spigot arrangement as in FIG. 34; and FIGS. 38A to 38E illustrate an alternate construction of T-joint using the same socket and spigot arrangement as in FIG. 34.

DETAILED DESCRIPTION OF THE PREFERRED EMBODIMENTS

The embodiments of the present invention will now be described by way of example only. They are currently the best ways known to the applicant of putting the invention into practice but they are not the only ways in which this can be achieved.

Figure 1:
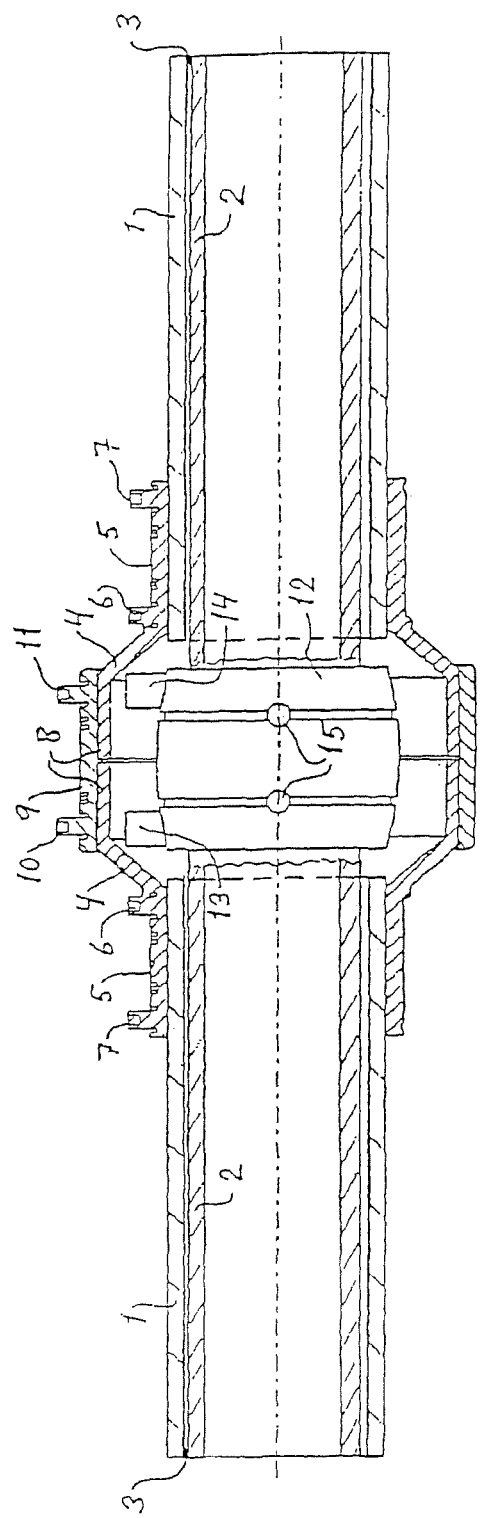
FIG. 1 illustrates joining two secondarily contained pipes in a linear fashion using conventional fittings.

In FIG. 1 the numeral 1 identifies the outer pipe and numeral 2 the inner pipe of a double-pipe conduit, and numeral 3 identifies a free space between the outer and inner pipes. Pipes of this kind are used, among other things, in underground conduits for transporting petroleum liquids (gasoline) in petrol stations and the like. The double pipes enhance security against leakage. Any fluid leaking through the inner pipe 2 will be collected in the annular space 3 between the pipes and conducted to the lowest point of the conduit.

When joining such pipes together, however, there arises the problem that the annular passageway 3 between the outer pipe and the inner pipe must also be sealed at the joint location against both the space in the inner pipe 2 and the atmosphere outside the outer pipe 1.

FIG. 1 illustrates how such a joint is formed at present with the aid of conventional fusion welding sockets. These include two reduction sockets 4, and a fusion welding socket 9. Electrical energy is supplied to these sockets through terminals 6, 7, 10 and 11. The inner pipes 2 are joined using a welding socket 12, using terminals 13 and 14 to supply electrical energy. It will be appreciated that three separate components are required, and three electrofusion welds are needed, in order to join two pieces of secondary pipe 1 around a primary pipe connection.

Figure 2:
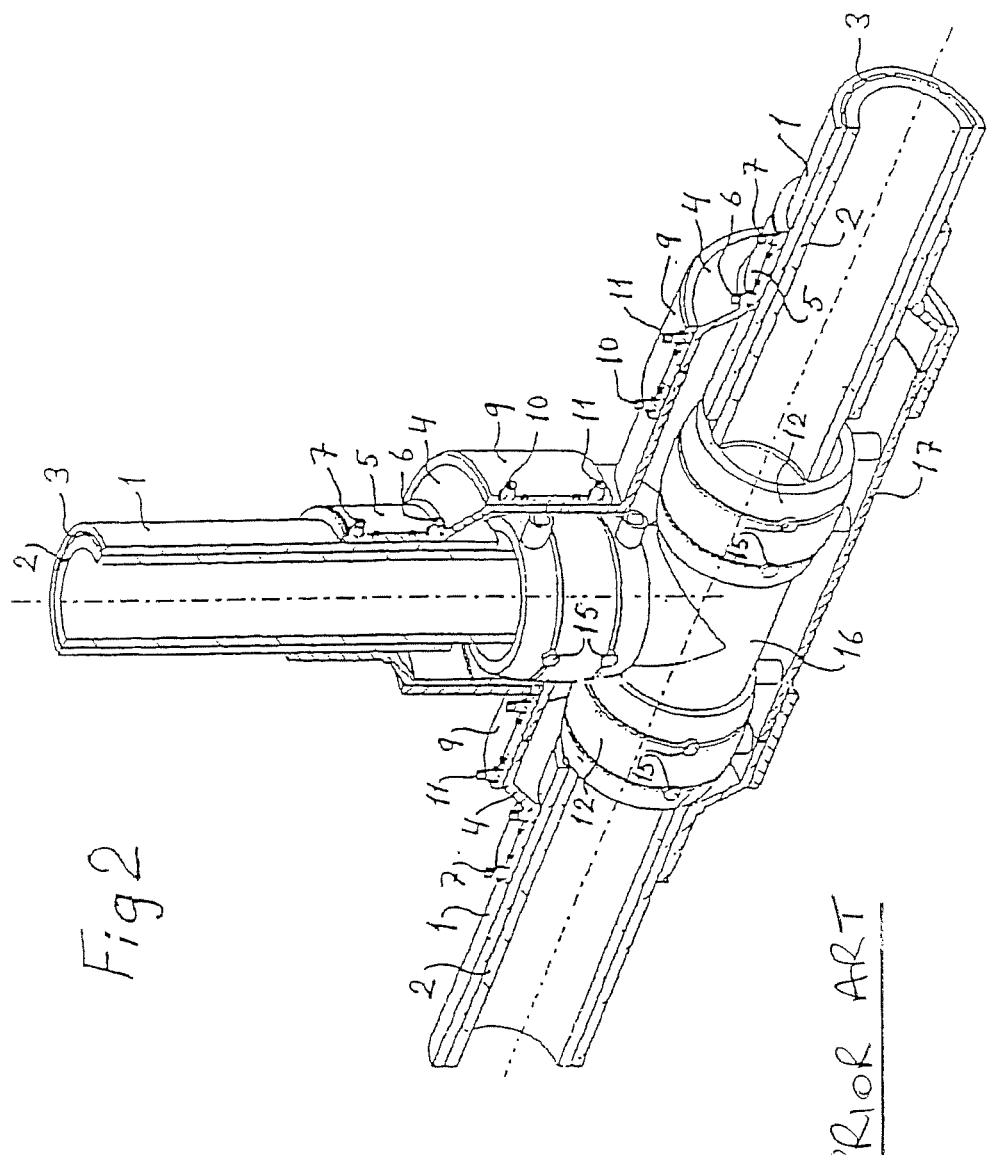
FIG. 2 illustrates joining secondarily contained pipes in a T configuration using conventional fittings.

FIG. 2, in which a similar numbering system has been used to that in FIG. 1, illustrates application of the conventional technology when joining together three double-pipe conduits with the aid of a so-called T-coupling. As will be apparent from the figure, this operation requires the use of a large number of components. Firstly, the inner pipes must be coupled together with the aid of an inner T-shaped tubular part 16 that is joined to respective inner pipes with the aid of three welding sockets 12 of the same type as those used in the straight join shown in FIG. 1. It is then necessary to connect an outer T-shaped tube part 17 to the outer pipes 1 with the aid of reduction welding sockets 4 and outer welding sockets 9 in a manner similar to that used in the straight join shown in FIG. 1. Thus, a total of eleven components and at least two time-spaced welding operations are required, with associated time consumption and cost. As in the former case, it is not possible to check whether or not the welding operations carried out in joining the inner pipes have been effected correctly prior to assembly of the secondary containment system.

Figure 3:
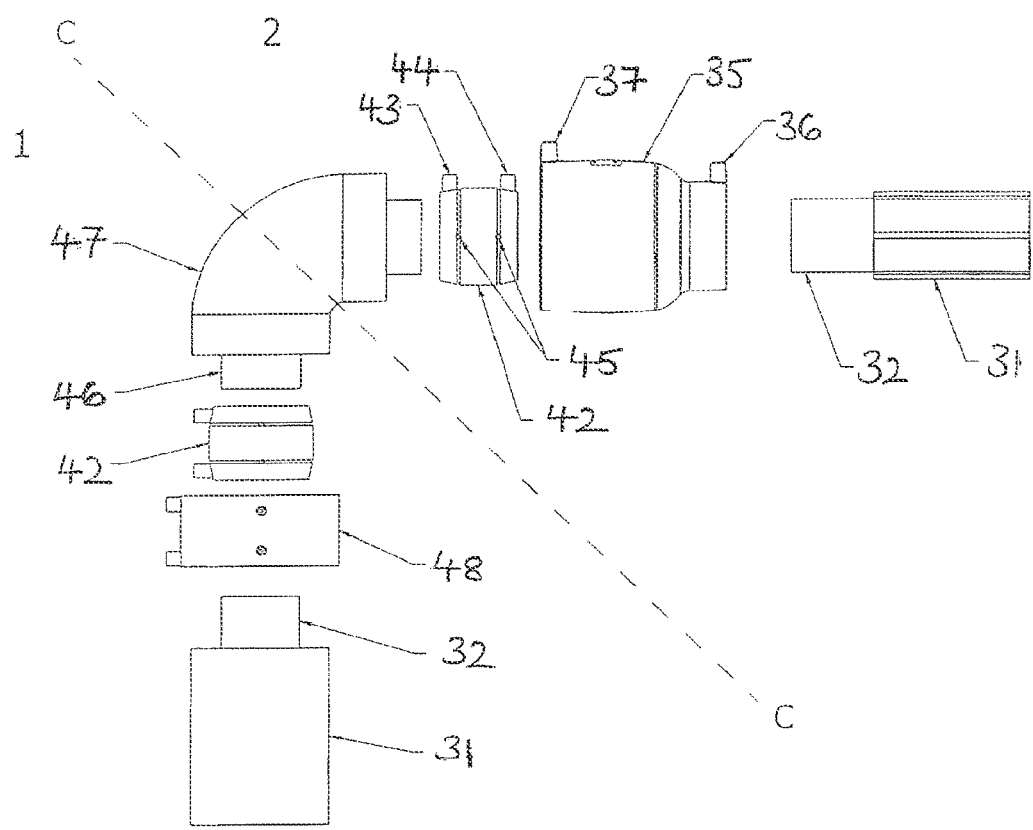
FIG. 3 illustrates various methods of forming a 90° elbow in a secondarily contained pipe using conventional fittings.

For completeness, FIG. 3 illustrates two options for making a secondarily contained 90° elbow joint using conventional fittings. It will be understood that both types of assembly would not generally be used on the same primary pipeline and are shown in this combination for illustrative purposes only. FIG. 3 illustrates two pieces of primary pipe 32 which are connected by means of a 90° elbow 46 and two primary welding sockets 42. The secondary pipe is either oversized, in the case of pipe 31, in which case a correspondingly oversized secondary welding socket 48 and secondary elbow 47 are required. Alternatively, a snug fitting secondary pipe 31 is used, similar to the examples given in FIGS. 1 and 2. In that case, a sliding reducer 35 is used to connect to the oversized 90° secondary elbow 47, the secondary elbow being sized to accommodate the primary welding sockets used to join the primary pipes 32 to the primary elbow 46.

As explained above, generally both sides of the elbow connection would be similar in construction. That is to say they would be a mirror image about line C-C in FIG. 3. The different arrangements are shown in the same drawing for illustrative purposes only.

Figures 4, 5:
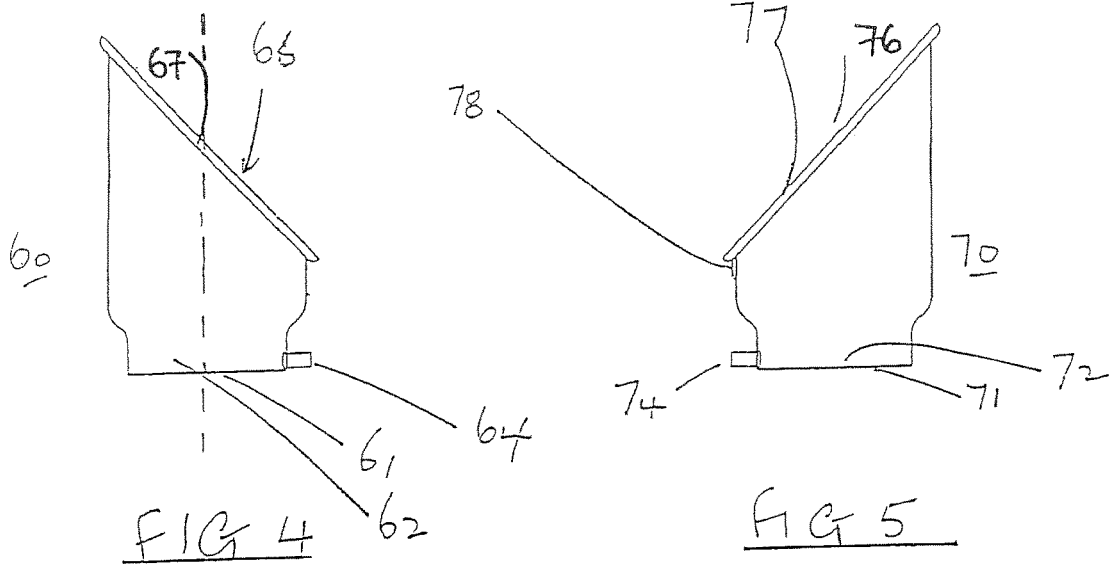
FIGS. 4 and 5 show coupling component according to a first embodiment of the present invention.
Figure 9:
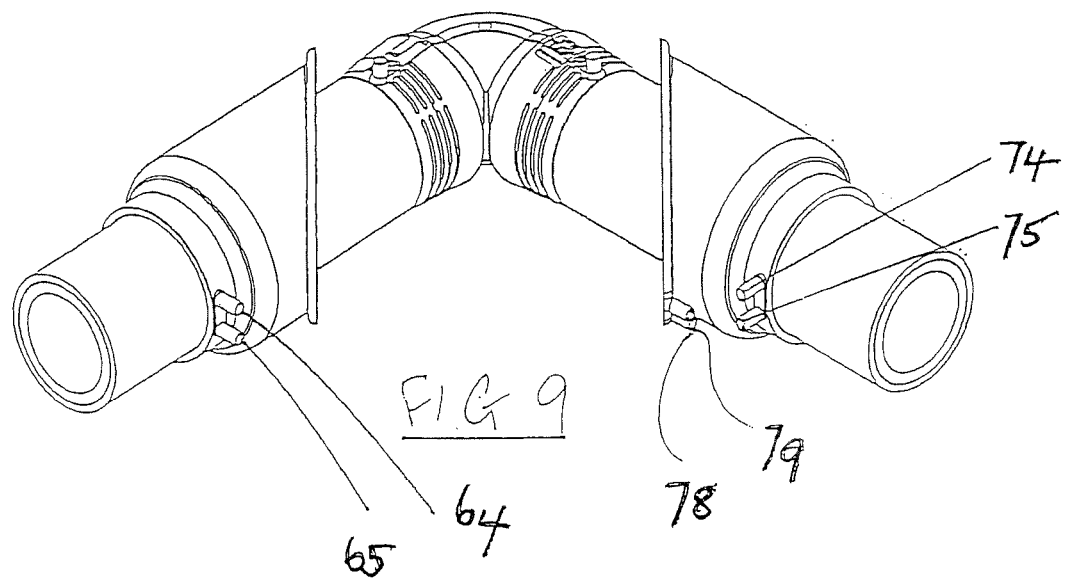
Figure 15A:
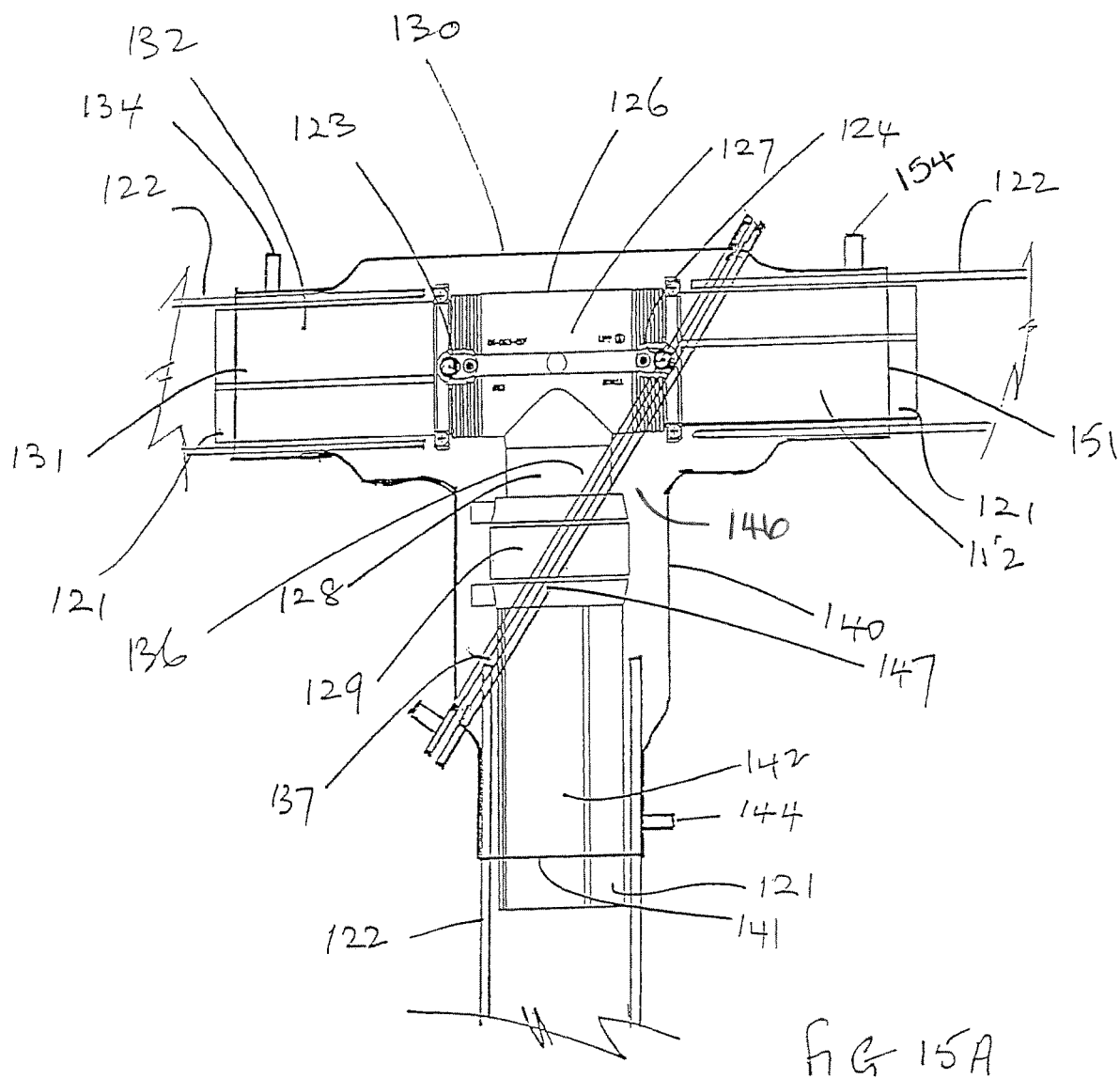
Figure 15C:
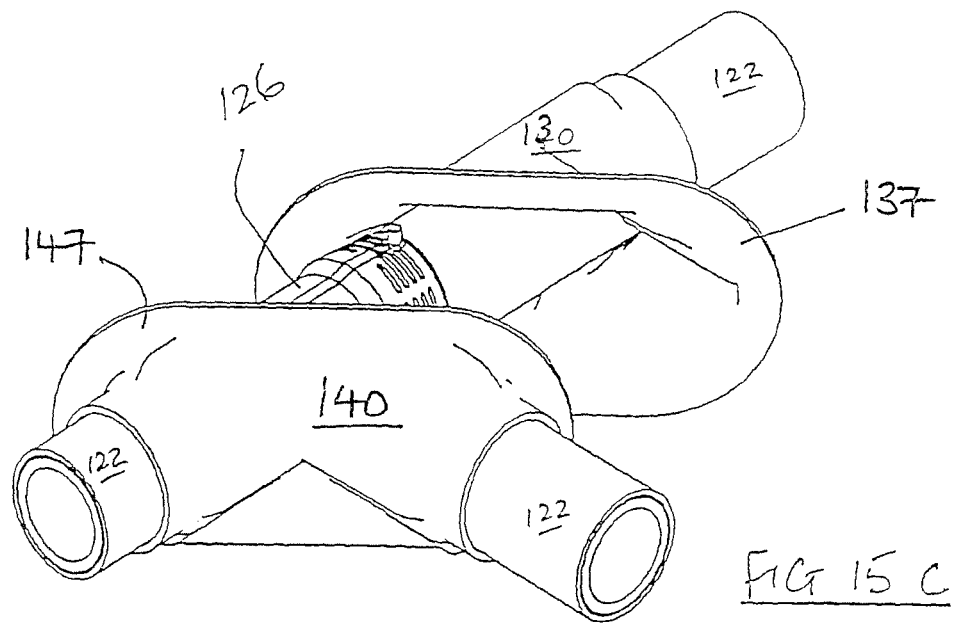
Figure 15D:
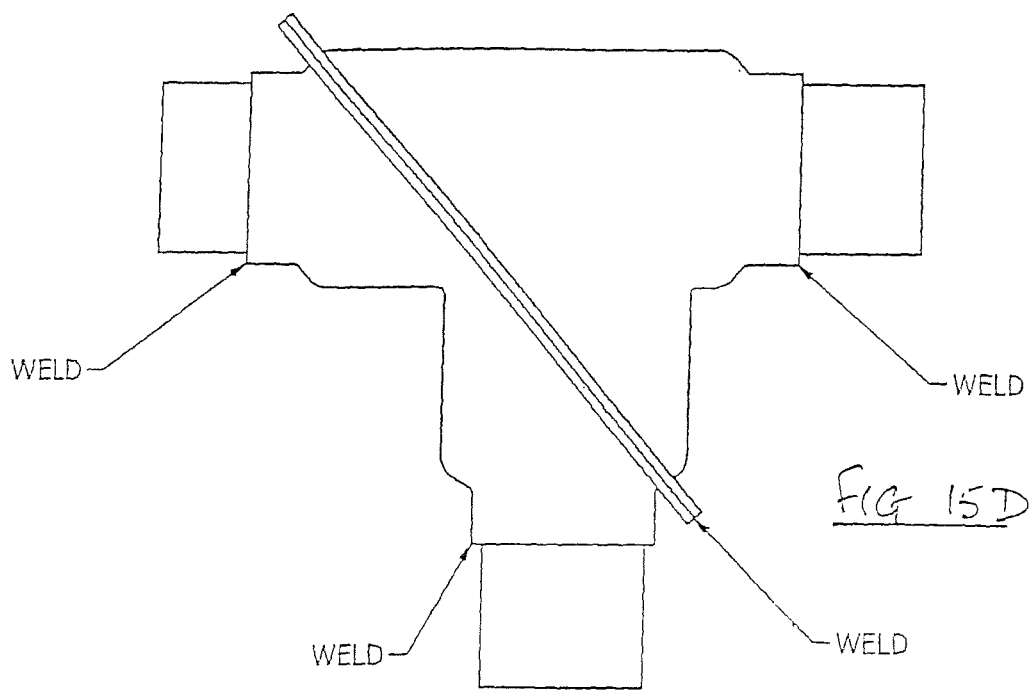
Figure 16:
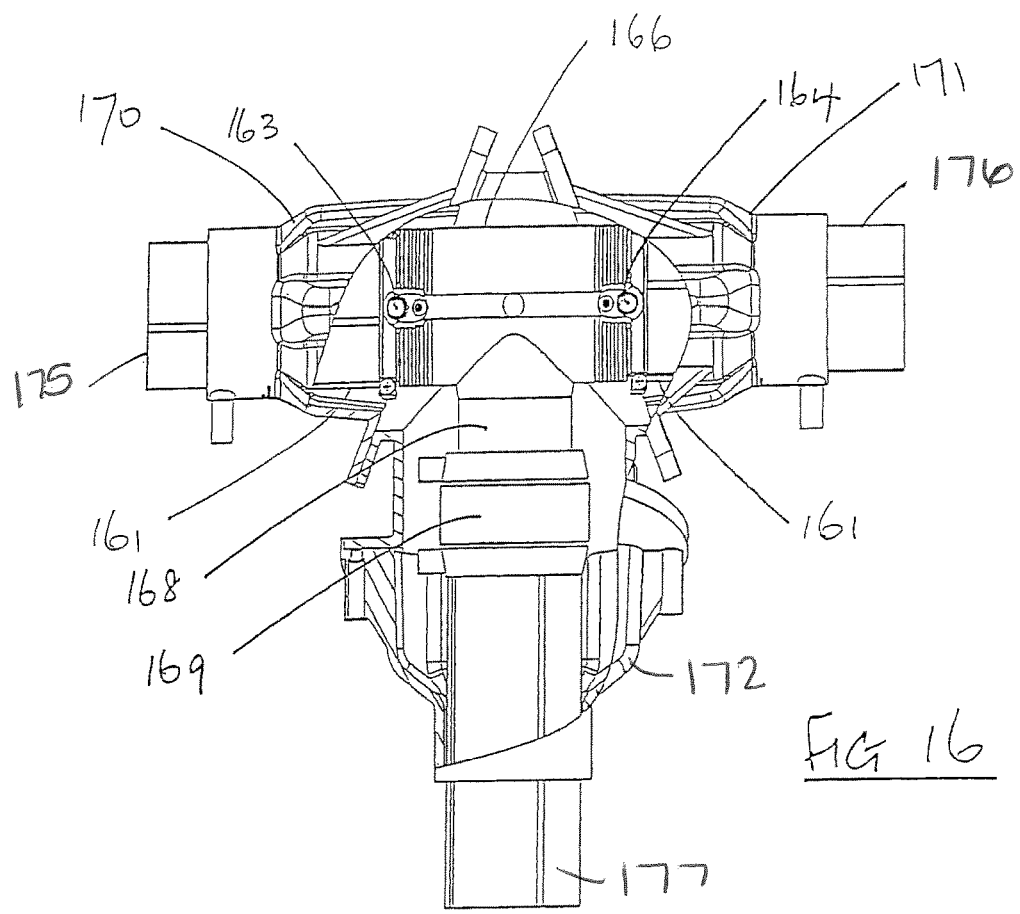
FIGS. 16 to 20 illustrate cutaway, plan elevation, expanded and assembled views respectively of a further embodiment of a T fitting.

Turning now to FIG. 4, this illustrates an electrofusion coupling component in the form of a sliding elbow component 60. This component is generally tubular in form having a first end 61 made up of a first tubular portion 62. This first portion has an internal diameter that is designed to be a tight sliding fit over the external diameter of a pipe (not shown), typically a secondary pipe. The first tubular portion also incorporates an electrical heating element (not shown). This heating element comprises an electrical winding coil located at or near the inner surface of the internal diameter of the first end of the component. Each end of the winding is connected to an electrical terminal connection 64, 65. Only one terminal is visible in the view shown in FIG. 4 but both these terminals are shown clearly in FIG. 9. Connection of these terminals to a welding machine and passing electrical current causes the first end of the coupling component to become fused to any pipe that is a sliding fit within that end of the component.

In this embodiment of the invention, electrofusion heating elements, and associated electrical terminal connections, are used as a sealing means to join two or more plastic components together in a substantially fluid-tight manner. It will however be appreciated that electrofusion is only one type of sealing means that can be used to join plastic components in this fashion. Other suitable sealing means include forming a bond or weld, including a chemical bond or weld, an ultrasonic weld or a heat weld; or a gasket seal with some clamping means to clamp the gasket between the plastic components. Suitable clamping means include bolts through the flanges. An example of this sealing method is illustrated in FIGS. 30 and 31 and described below.

A combination of these sealing means may also be used, as determined by the materials specialist.

The use of non-electrofusion means for sealing the respective coupling components to each other, and to the associated pipework, means that a wide range of different plastics, including thermosetting plastics, can be used to construct the various coupling components and the pipes being joined. So these coupling assemblies are not limited to use with electrofusible plastics. They can, for example, be used with pipes made from PVC and from FRP (fibre reinforced polymer). In these examples and with these materials, chemical bonding is particularly preferred.

Possible thermosetting plastics may be selected from the group comprising:—
Allyl resins (Allyls);
Epoxys;
Polyesters;
Polyurethanes (PU).

Corresponding resins may be used for bonding the various components together, and to the pipes.

So, whilst these examples employ electrofusion welding as a sealing means, this is not intended to be a limiting feature, in that any suitable sealing means may be employed. The technology associated with such sealing means is known per se.

The term "sliding fit" is a term known in the art, especially to those involved in forming electrofusion connections on pipes. In order for there to be good contact between the outside of the pipe and the inside of the electrofusion fitting, a good snug fit between the two components is required, such that contact is made with the inside of the fitting around substantially the whole outer circumference of the pipe. This is a commonplace design feature in such electrofusion couplings.

A second end of the coupling component 66, which is generally larger in its inside diameter than the first end, terminates in an end face which includes a mating region in the form of a flange 67 extending radially from and radially in the plane of the end face. In this example the end face and thus the face of the flange is substantially planar, but formed in a plane that is substantially non-perpendicular to the general longitudinal axis of the component. This longitudinal axis is shown as a dotted line in FIG. 4, such that the corresponding flange on a second, similar electrofusion coupling component will mate with the flange on the first component to form an electrofusion coupling having one or more predetermined angles.

Figure 6:
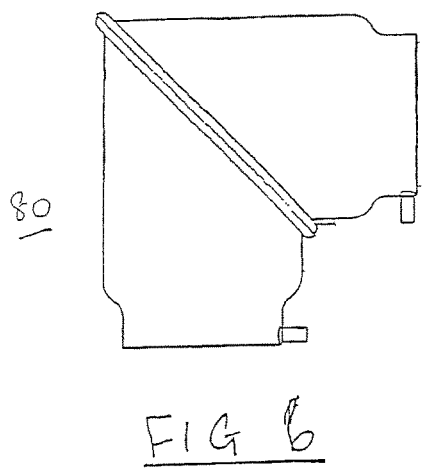
FIG. 6 shows the coupling components of FIGS. 4 and 5 fitted together in a 90° elbow configuration.
Figure 7:
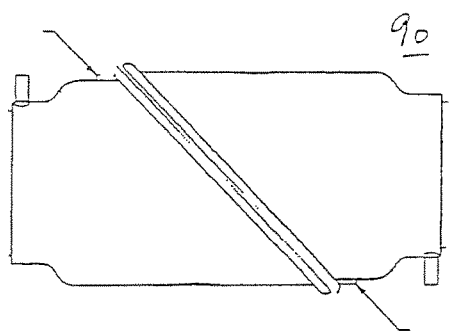
FIG. 7 shows the coupling components of FIGS. 4 and 5 fitted together in a linear configuration.

So for example if the end face and thus the face of the flange on each component is at 45° to the longitudinal axis of the component, as is shown in FIGS. 4 and 5, the two components can mate together to form a 90° elbow coupling 80, as shown in FIG. 6, or a linear coupling 90 as shown in FIG. 7. Thus, providing two complementary components therefore serves two purposes. They can encapsulate a 90° elbow coupling in the primary pipe or a linear, 180° coupling in the primary pipe and thus maintain continuous secondary containment across either configuration of such couplings.

However, these angles can be varied by the designer depending on the desired angle between the pipes to be joined. Nor do the two components need to be symmetrical, providing for further variation in these angles.

It will be understood that the internal diameter of the second end of the component must be larger than the internal diameter of the first end. The second end need not be circular cylindrical in cross-section and an example having a generally oval second end is shown in FIGS. 15A to D described below. So more accurately the internal cross-sectional area of the opening in the second end is greater than that of the first end. Furthermore, the size and angle of the flanges means that two components will only mate together at specific angles. In the fittings described so far those angles are 90° and 180°. In some of the fittings described below the components will only mate together in one particular specific and pre-determined configuration.

The component shown in FIG. 5, in which a corresponding numbering system has been used to that in FIG. 4, is identical to the fitting shown in FIG. 4 with two exceptions. Firstly it is a mirror image of the fitting shown in FIG. 4, although that is not necessary. Secondly, and more importantly, the flange face 77 incorporates an electrical heating element 73. This takes the form of an electrical winding coil located at or near the surface of the flange with each end of the coil attached to an electrical terminal 78, 79. In this way, once the opposing flanges of two components are clamped together, the flanges can be electrofused to become a single component. The electrical terminals for the windings 78, 79 in the component shown in FIG. 5 can be seen more clearly in FIGS. 9 and 14.

Figure 8:
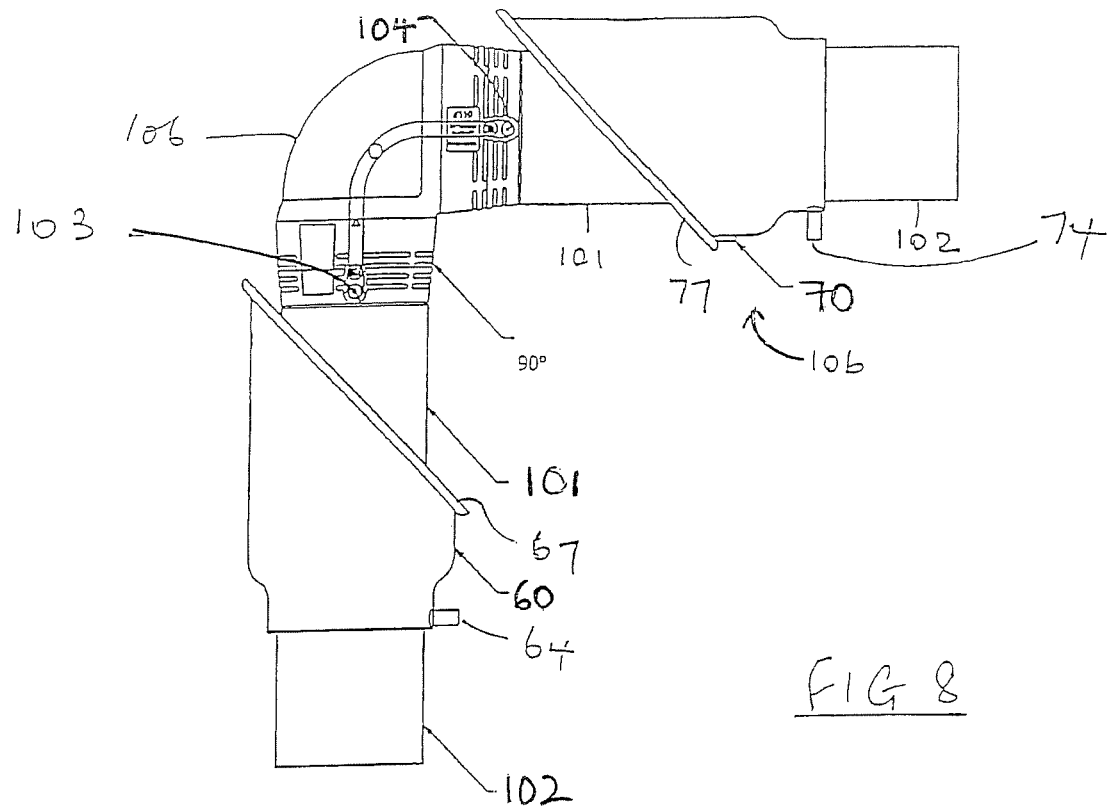
FIGS. 8 and 9 illustrate the coupling components of FIGS. 4 and 5 assembled around a 90° elbow in an open position to allow welding and pressure testing of a primary 90° elbow fitting.

FIG. 8 shows a partially completed 90° elbow fitting with secondary containment. Two sections of primary pipe 101 have been joined together using a 90° electrofusion elbow 106 and the integrity of the joint tested. Secondary pipes 102 are already in position with 90° sliding elbow components 60, 70 pulled back over the secondary pipe to leave the primary coupling clear so that the join in the primary pipe can be formed unhindered. Once the joint in the primary pipe is completed and tested, the sliding elbow components 60, 70 are slid forward over the secondary pipe such that they meet, as shown in FIGS. 10 and 11. Clamping the two flanges 67, 77 together with a clamping means and connection of terminals 74, 75 to a welding machine enables the two sliding elbow components to be welded together as one and the coupling can then be welded to each secondary pipe either sequentially or in a simultaneous manner. If required the individual components can be welded to the secondary pipe in an initial operation and the flanges welded together in a subsequent operation. Or alternatively all 3 welding operations can be carried out simultaneously.

A finished coupling is shown in FIGS. 10, 11 and 12.

A variety of clamping means can be used to hold the two flanges in close juxtaposition. For example, barbed pins can be incorporated into one of the flanges, these barbed pins being secured, in use, through holes in the corresponding but opposing flange but preferably outside the welding zone. Alternatively U-profile clips can be used to clip over the edges of both flanges, holding them in place while the welding operation takes place. These clips can be separate items or can be incorporated into one or other of the flanges. For example, a quick release over-centre-action fastener, of the type used on ski boots could be employed. Conventional G-clamps or C-clamps of the appropriate size could be used. Alternatively a plurality of toggle clamps could be used. In a further alternative a plurality of spring loaded clamps could be employed.

In summary, any clamping means capable of maintaining these mating flange faces in contact during the electrofusion operation whether integral to the fitting or independent and separate from the fitting may be used.

The same components and procedure can be used to form an in-line joint (180° coupling) as shown schematically in FIGS. 13 and 14.

An embodiment using the principles illustrated in FIGS. 4 to 14 inclusive applied to a T fitting is illustrated in FIGS. 15A to D. This shows a conventional T coupling 126, having a body 127 that provides connections for two primary pipes 121 in an in-line configuration across the top of the T. These connections have built in electrofusion windings 123 and 124. The coupling body also includes a spigot 129 set substantially at right angles to the rest of the fitting. Spigot 128 is electrofusion welded in use to primary pipe 121 using a conventional electrofusion coupling 129.

Two flanged electrofusing coupling components 130 and 140 are provided which are both a sliding fit with secondary pipes 122. Coupling component 130 is a sliding fit with just one portion of secondary pipe 122 and thus may be drawn back, prior to the electrofusion of the two secondary containment coupling components, to allow access for the T coupling on the primary pipe to be installed, welded and the resulting joints pressure tested. This access is important to allow the joints in the primary pipe to be completed and tested before the secondary containment is sealed in place. This access is provided in part by the shape of the fitting and in part by the position of and the angle of the flanged connection between the various parts of the fitting.

As with the previous examples, this electrofusion coupling component has a first end 131 made up of a first tubular portion 132. This first portion has an internal diameter that is designed to be a tight sliding fit over the external diameter of a pipe, typically a secondary pipe. The first tubular portion also incorporates an electrical heating element 133 (not shown). This heating element comprises an electrical winding coil located at or near the inner surface of the internal diameter of the first end of the component. Each end of the winding is connected to a terminal connection 134, 135. Only one terminal is visible in the view shown in FIG. 15. Connection of these terminals to a welding machine and passing electrical current causes the first end of the coupling component to become fused to any pipe that is a sliding fit within that end of the component.

The second end of the fitting 136 terminates in an end face which includes a mating region in the form of a flange 137 extending radially from and radially in the plane of the end face. The size and shape of the component 130 in the region of the second end 136 is such that it will accommodate the primary pipe T coupling designed to fit within it. The flange 137 has a mating face designed to be a mating fit with a corresponding flange 147 on a second electrofusion coupling component 140. The external circumference of the flange may be substantially circular but it could equally well be a different shape, such as generally oblong or oval, as in this example.

A second, complementary coupling component 140 with a mating flange face 147 is also shown in FIG. 15. This second coupling component has tubular portions 142 and 152 that are a tight sliding fit with two separate secondary pipes 122. Electrofusion windings 143 and 153 (not shown) and associated terminal connections 144, 145, 154, 155 enable these tubular portions to be welded in a fluid-tight manner to the secondary pipes 122. The mating flange 147 does not require any electrofusion windings.

It will be appreciated that the location of the flanged joint 137, 147 with respect to the T coupling on the primary pipes can be adjusted to allow full and convenient access to the primary coupling. The two components 130 and 140 are not mirror images of each other so the join between them can be located as required, ensuring proper access to complete the joining together of 3 sections of primary pipe in a T configuration.

FIG. 15B shows the relative dimensions of the secondary pipe 122 which has a diameter Y. Typically Y may, for example, be 125 mm. This contrasts with the primary pipe 121 which has a diameter X, where X may be for example 110 mm where the secondary pipe is 125 mm in diameter as in this example.

FIGS. 16 to 20 inclusive illustrate an alternative version of a secondary T electrofusion coupling. In this case, use is made of the angled coupling components of the type illustrated in FIGS. 4 to 11. A T coupling 166 for joining 3 primary pipes 161 similar to that described in FIG. 15 is shown in the cutaway region of FIG. 16. In this embodiment, four electrofusion coupling components 170, 171, 172, 173 are used to join three separate portions of secondary pipe 162 in a T configuration. Three of these electrofusion coupling components 170, 171, 172 are identical and correspond to the type of component 60 or 70 shown in FIGS. 4 and 5, depending on whether the electrofusion windings are required in these components or are provided in a fourth component 173. It is also possible to use a mixture of components, with and without electrofusion windings if desired. It will be understood that only one flange in a pair of engaging flanges must incorporate electrofusion windings. Which flange contains these windings is not material in terms of the inventive concept but there may be practical advantages of locating these windings in a particular flange face.

Figure 17:
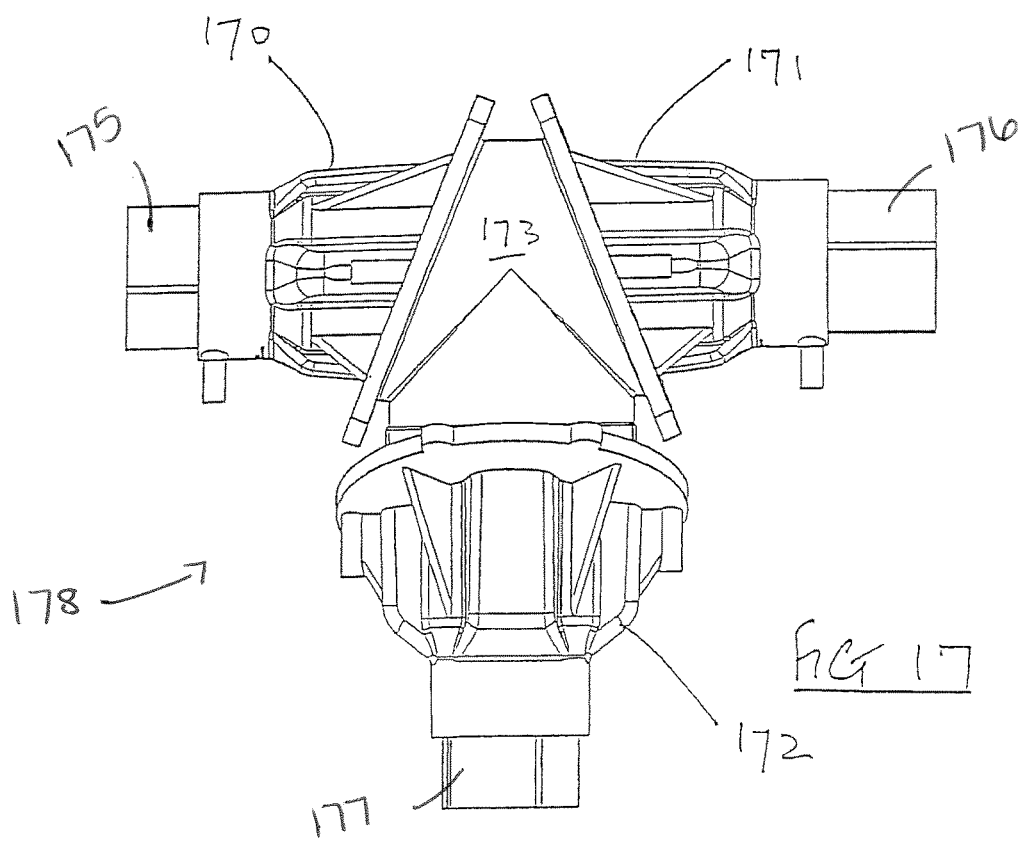
Figure 18:
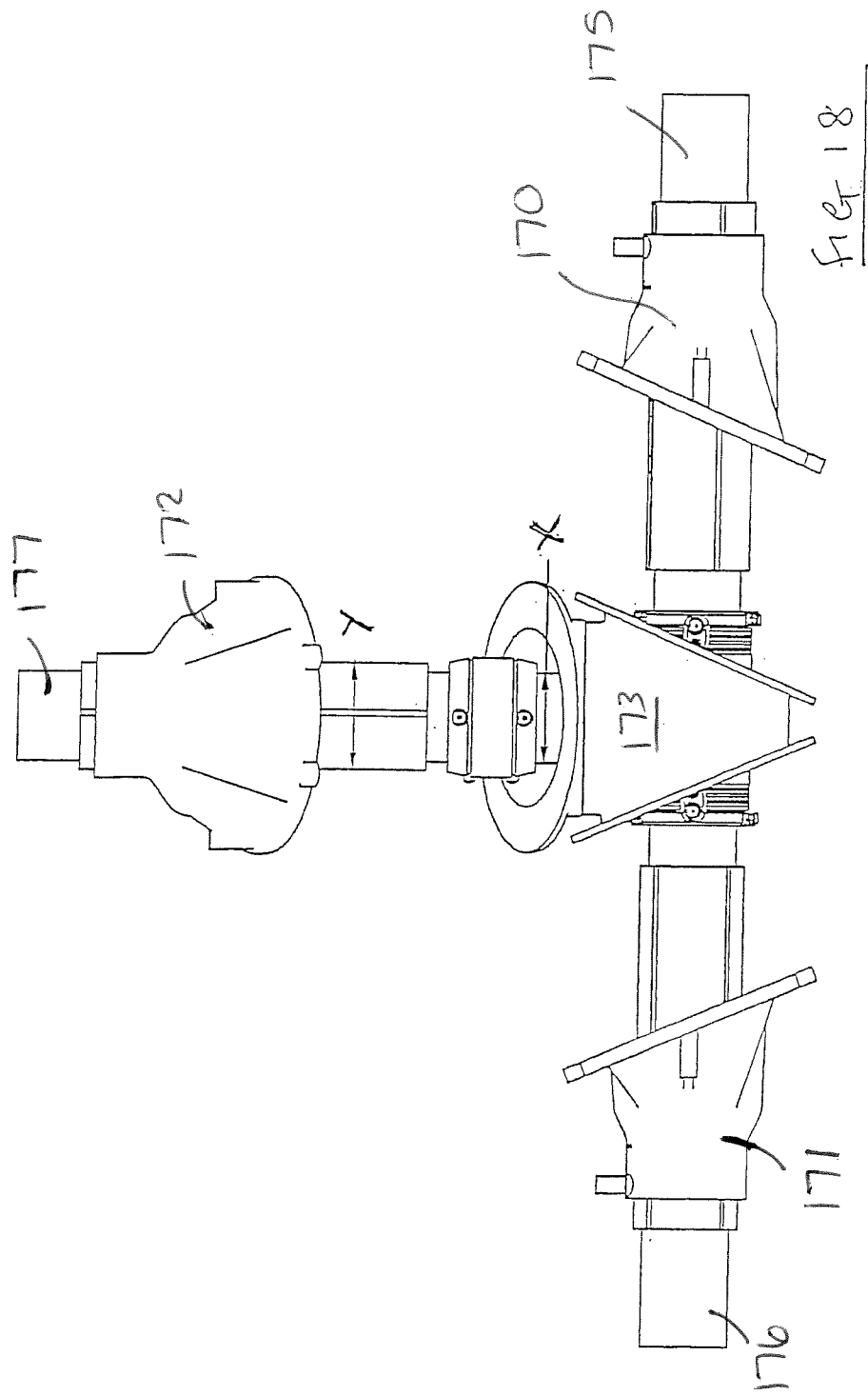
Figure 19:
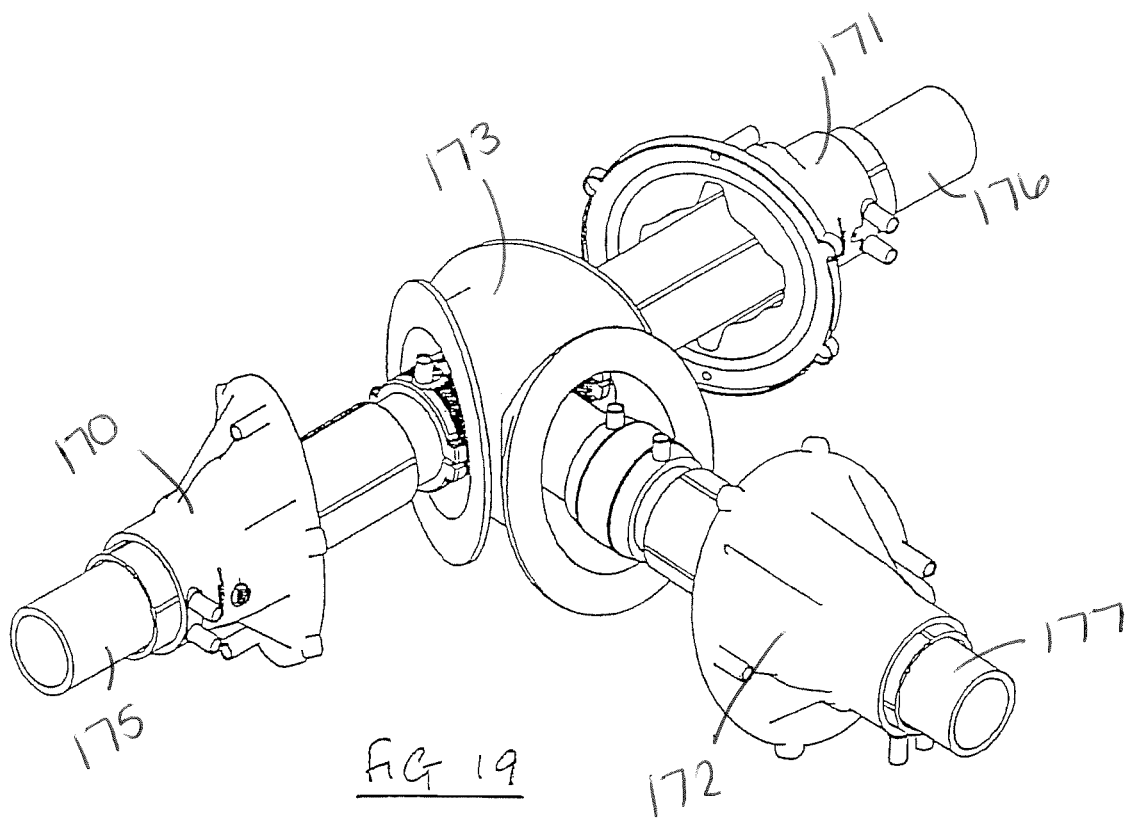
Figure 20:
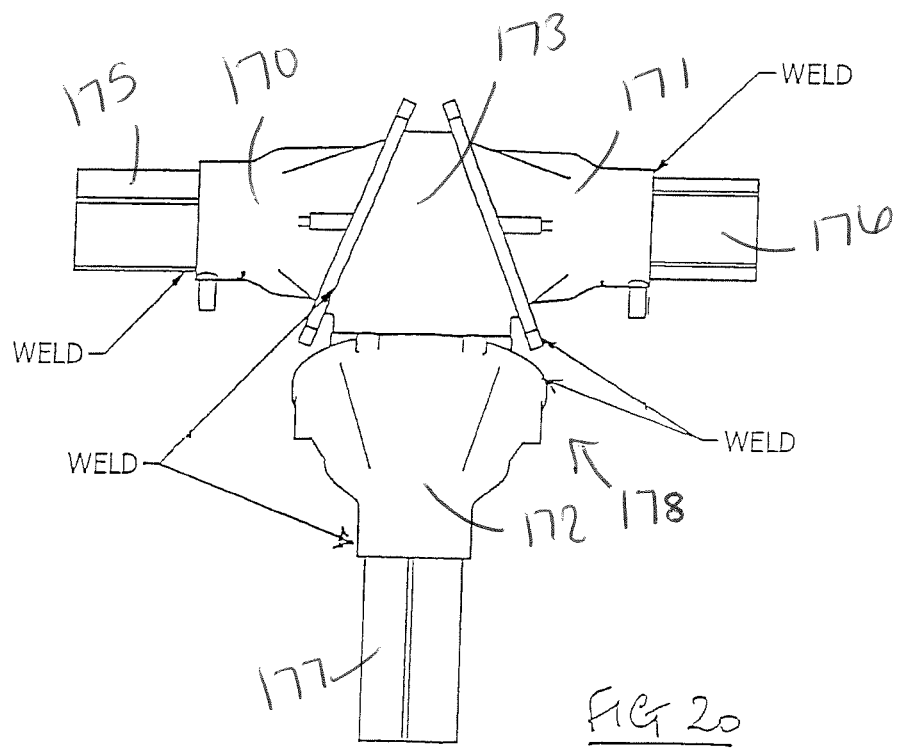

The fourth component 173 has a central hollow body 174 which is large enough to accommodate within it the primary pipe T coupling and allow access for the primary T-coupling to be formed and pressure tested prior to assembly of the secondary containment. As with the earlier examples, the sliding components 170, 171 and 172 are slid back along the respective sections of secondary pipe while this welding operation on the primary pipes takes place and the integrity of the primary pipe connection is tested. This arrangement is shown in FIGS. 18 and 19. Components 170, 171 and 172 are then slid into place as shown in FIGS. 17 and 20, clamped together as necessary and the electrofusion welds made. The respective components are then welded to the secondary pipes.

As with the previous embodiments, the flange faces of the various coupling components are angled from the plane perpendicular to the general longitudinal axis of the electrofusion coupling assembly. Where there is more than one longitudinal axis, as with a T-fitting, the flanges on all of the components may be angled in this way. The angled orientation and configuration of the flanges is important in order to allow access to construct and test the coupling in the primary pipes.

The respective diameters X and Y of the primary and secondary pipes may be similar to those described above.

Figure 21:
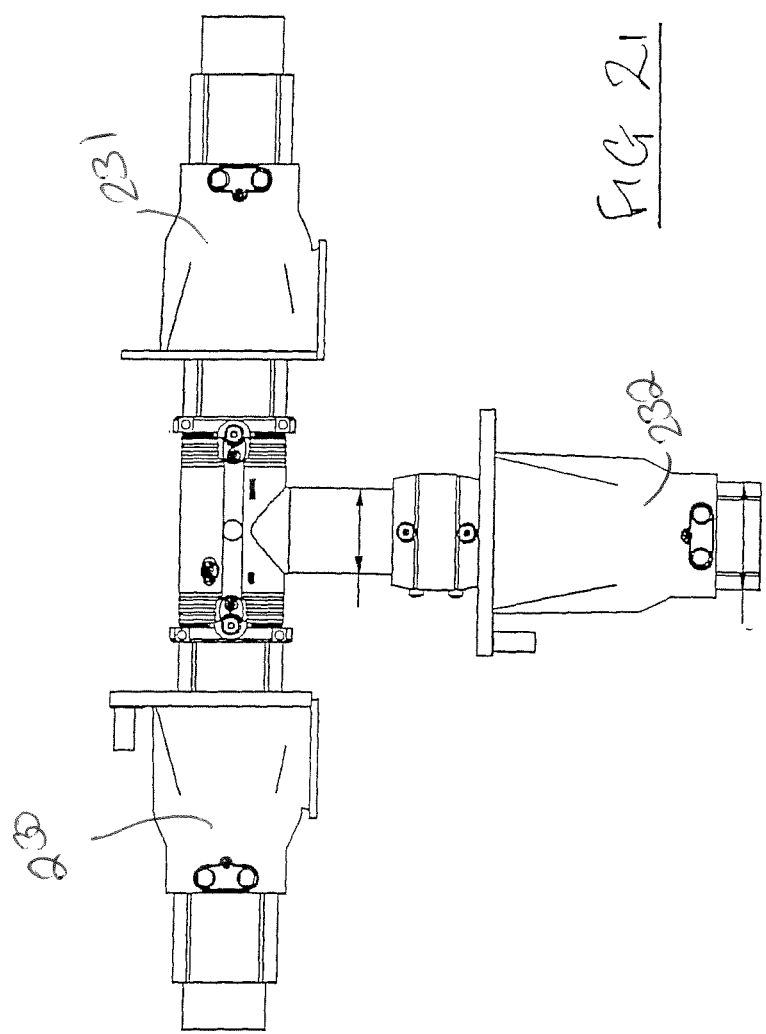
FIGS. 21, 22 and 23 illustrate expanded plan and perspective views and an assembled plan view of a further embodiment of a T fitting.
Figure 22:
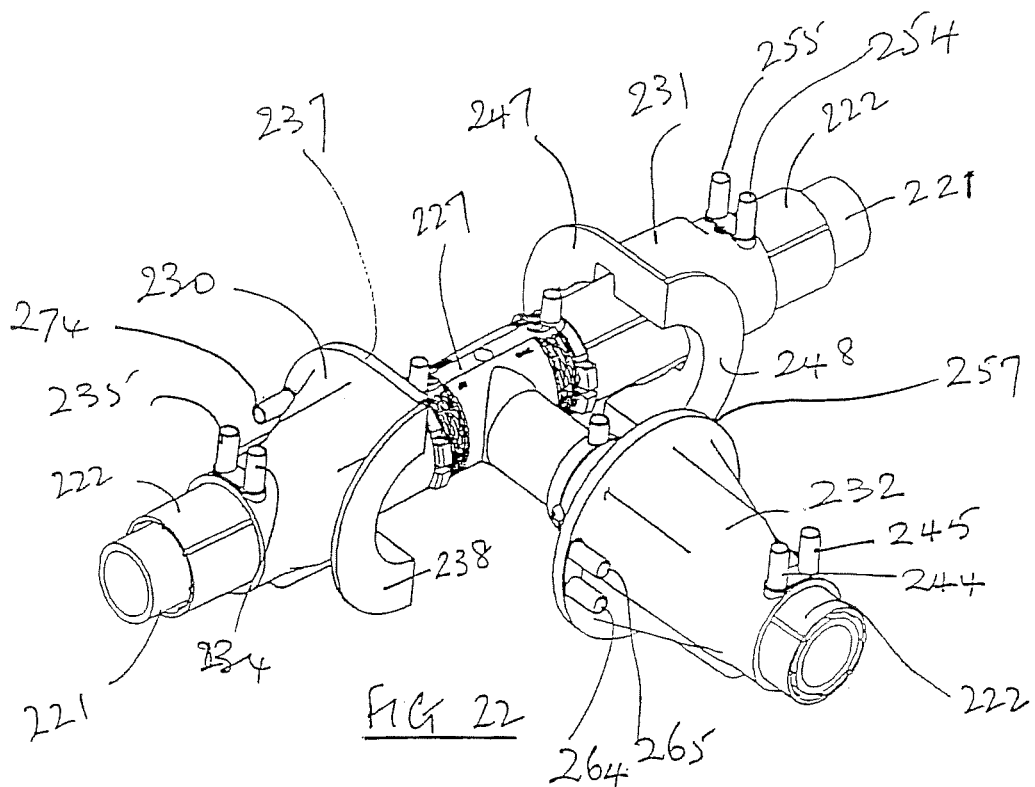
Figure 23:
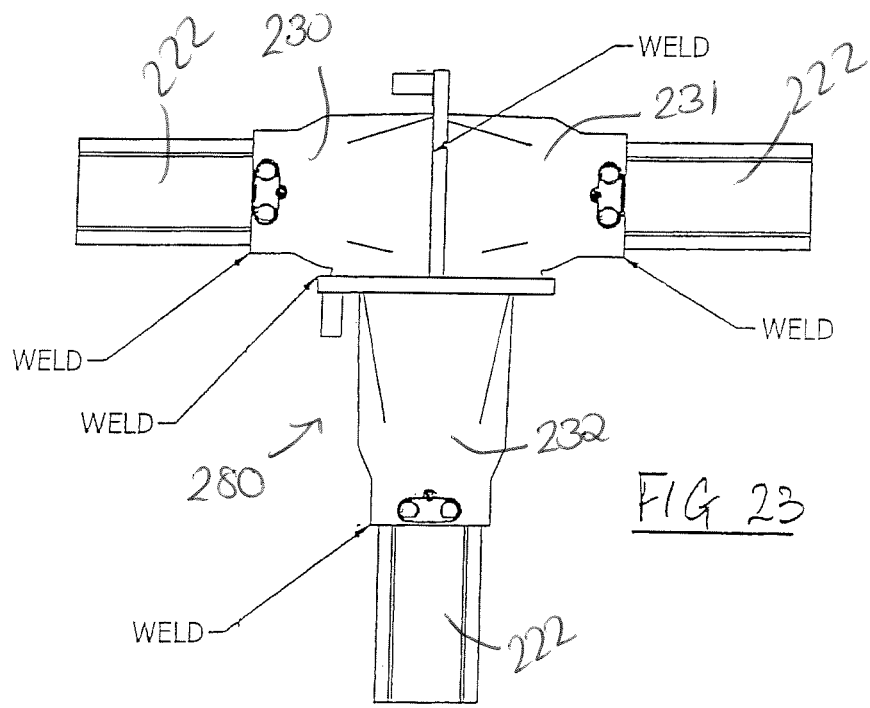

A further embodiment is shown in FIGS. 21 to 23 inclusive in which a similar numbering system has been used as in the earlier Figures. FIGS. 21 to 23 illustrate an alternative version of a secondary electrofusion coupling in which the flanges on two of the components, rather than being planar, are formed from two flange portions set substantially at right angles to each other. Thus a first component 230 has two flange faces or portions 237 and 238 set substantially orthogonal to each other. Flange portion 238 is thus in a plane non-perpendicular to the general longitudinal axis of the component. In fact, flange portion 238 is generally parallel to the longitudinal axis of the component. Similarly with component 231, which has flange portions 247 and 248, portion 248 is in a plane generally parallel with the longitudinal axis of the component.

A third component 232 having a planar flange 257, which provides a mating face for flange portion 238 and flange portion 248, completes the electrofusion coupling assembly.

These three components are provided with the necessary electrofusion heating elements and electrical connection terminals 234, 235, 244, 245, 254, 255, 264, 265, 274, 275 such that each component can be electrofused to its respective secondary pipe 222, and to the mating flange or flange portions with which it makes contact in the assembled state, as shown in FIG. 23. FIG. 23 shows the position of these welds.

Figure 24:
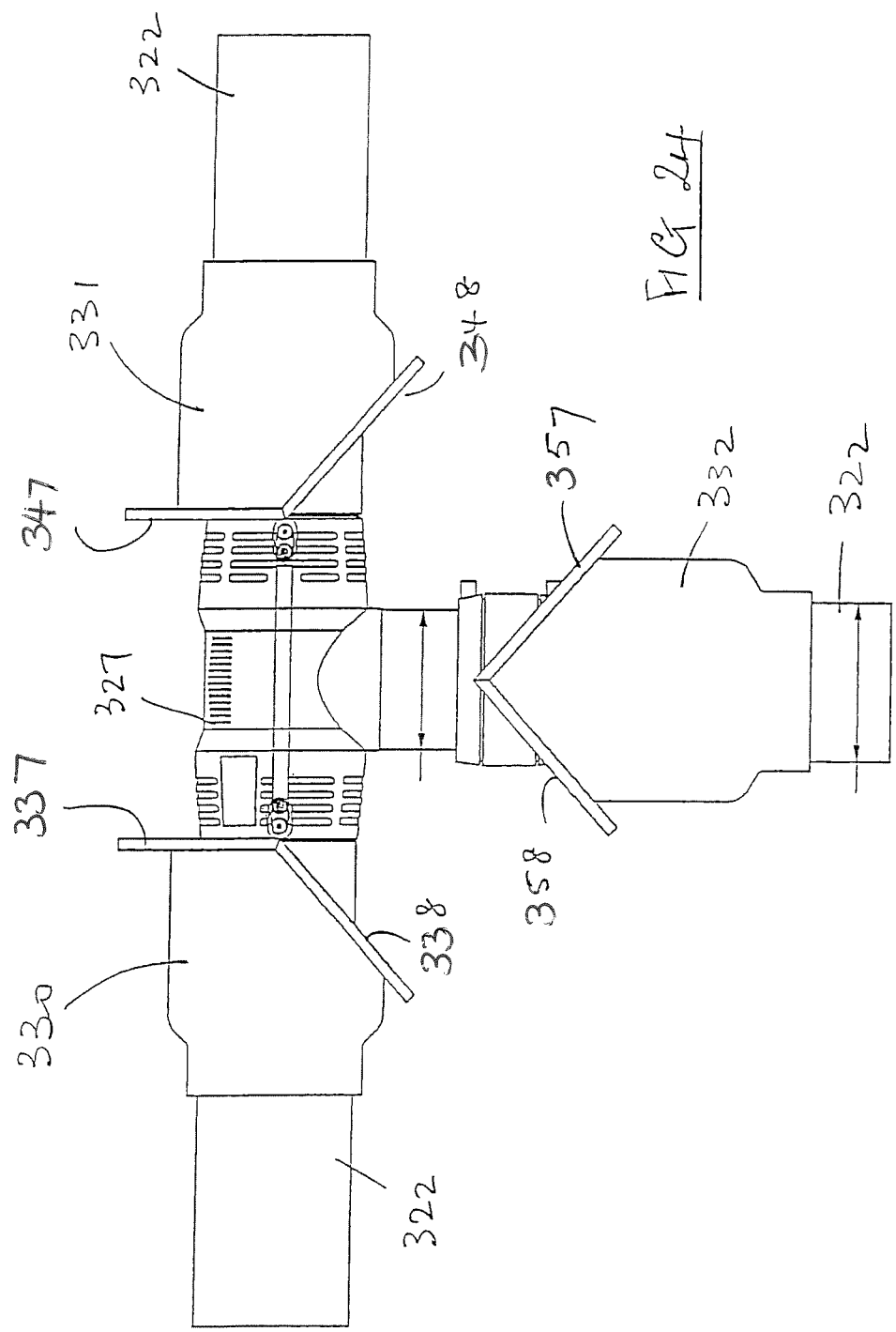
FIGS. 24, 25 and 26 illustrate expanded plan and perspective views and an assembled plan view of a further embodiment of a T fitting.
Figure 25:
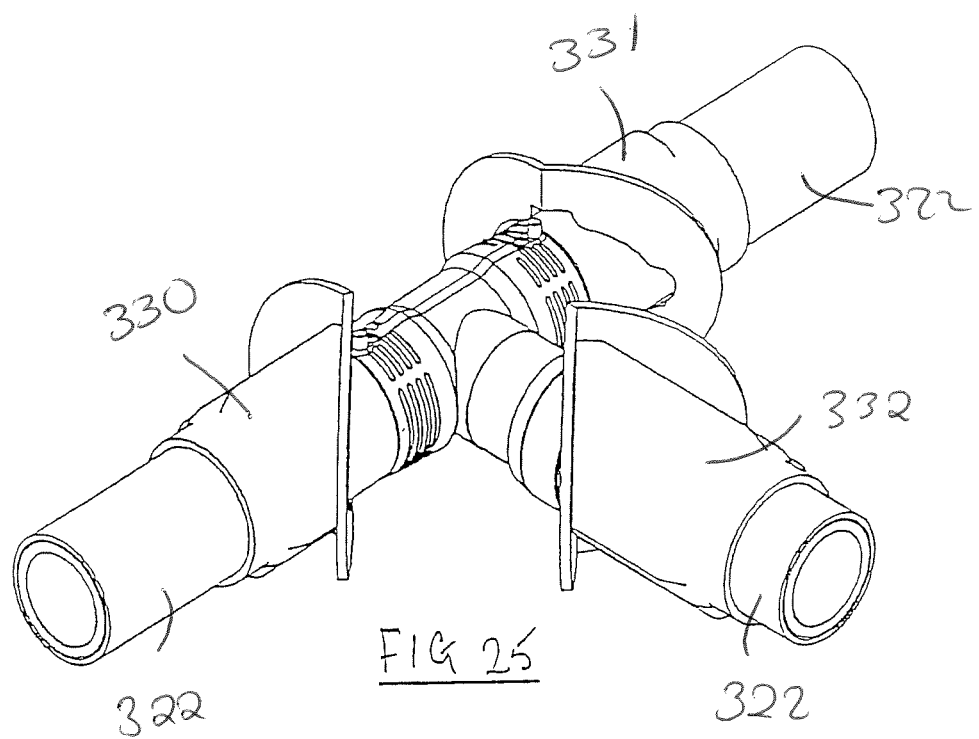
Figure 26:
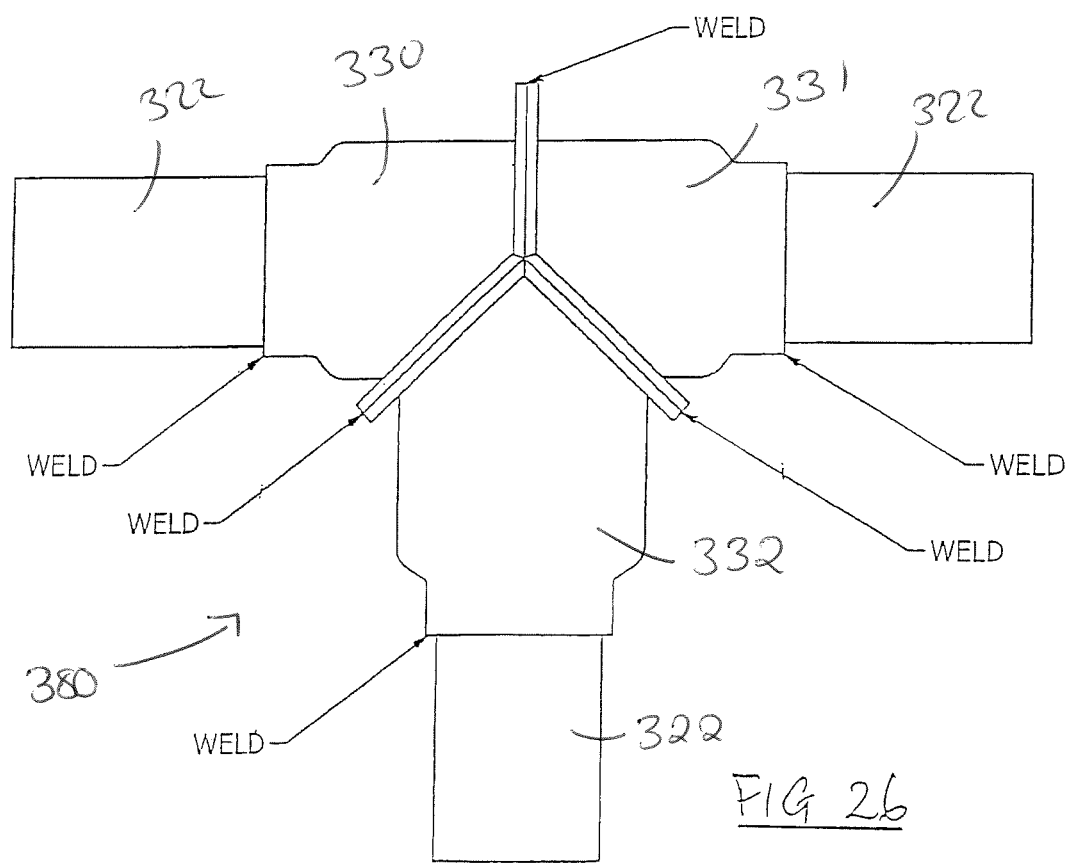

A variation of the embodiment shown in FIGS. 21 to 23 is illustrated in FIGS. 24 to 26 inclusive. In this case, rather than the flange portions on the two opposing components being at right angles to each other they are angled at about 135°. The flange portions on the third component 332 are angled at approximately 90° to each other. The flange portions thus meet in a star-shaped arrangement as shown in FIG. 26. Heating elements are provided in opposing flange faces as necessary and as determined by the designer. In this embodiment each component has a flange portion that is offset from the longitudinal axis of the component.

It will be appreciated from the above description that the divisions between the various coupling components can be made in a wide variety of ways, as determined by the designer, providing they give clear access to form the primary coupling and the mating flange faces or flange portions can be electrofused together. This novel concept provides a number of advantages. Firstly, a wide variety of sealing means can be used to join the components together, and the invention is not limited to electrofusion couplings, although these are a preferred method of forming a substantially fluid-tight seal between components. Secondly, the arrangement of flange faces and the fact that the fitting components generally slide over the pipe onto which they will eventually be joined, provides unrestricted access to create, make and test the joint in the primary pipe, before making a corresponding joint in the secondary pipe.

Figure 27:
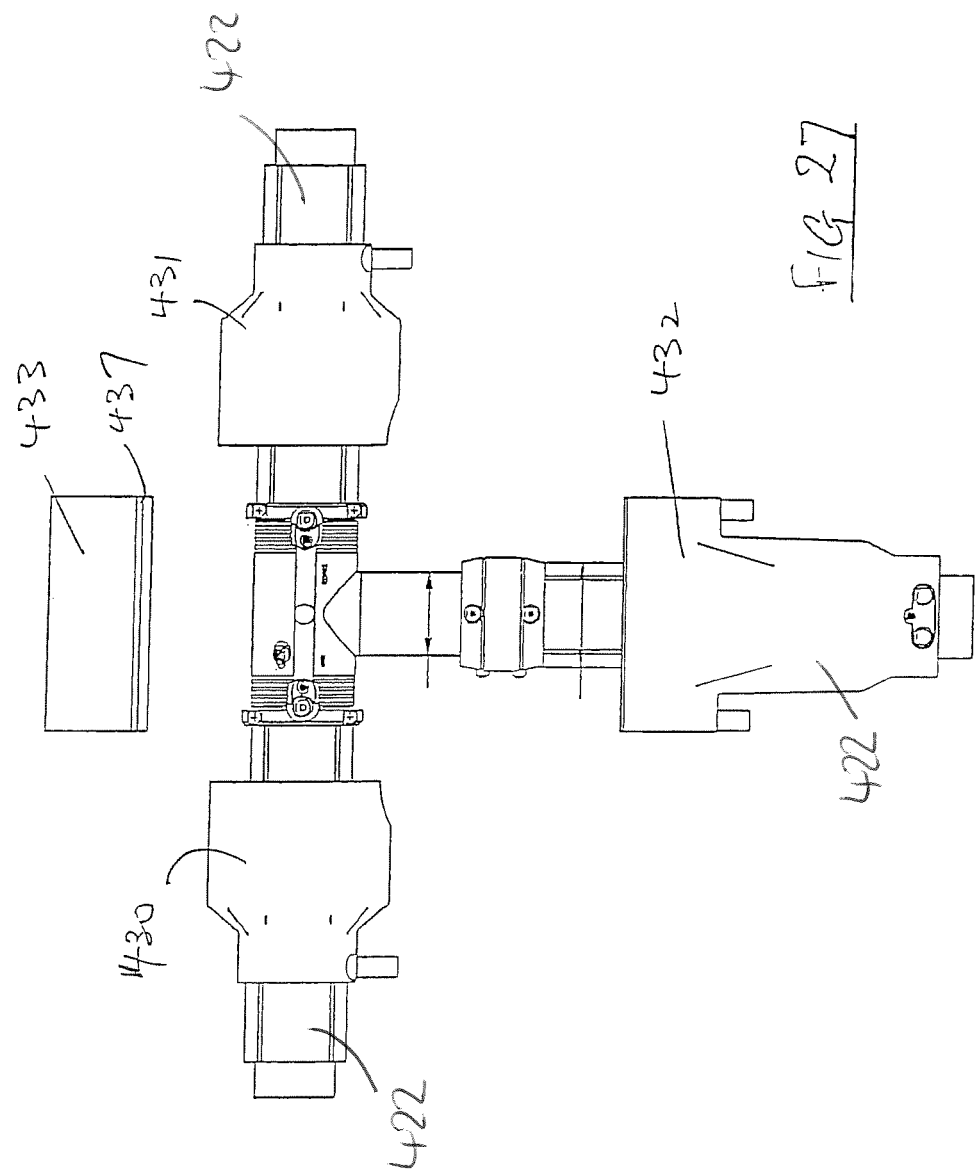
FIGS. 27, 28 and 29 illustrate expanded plan and perspective views and an assembled plan view of a further T fitting according to the present invention.
Figure 28:
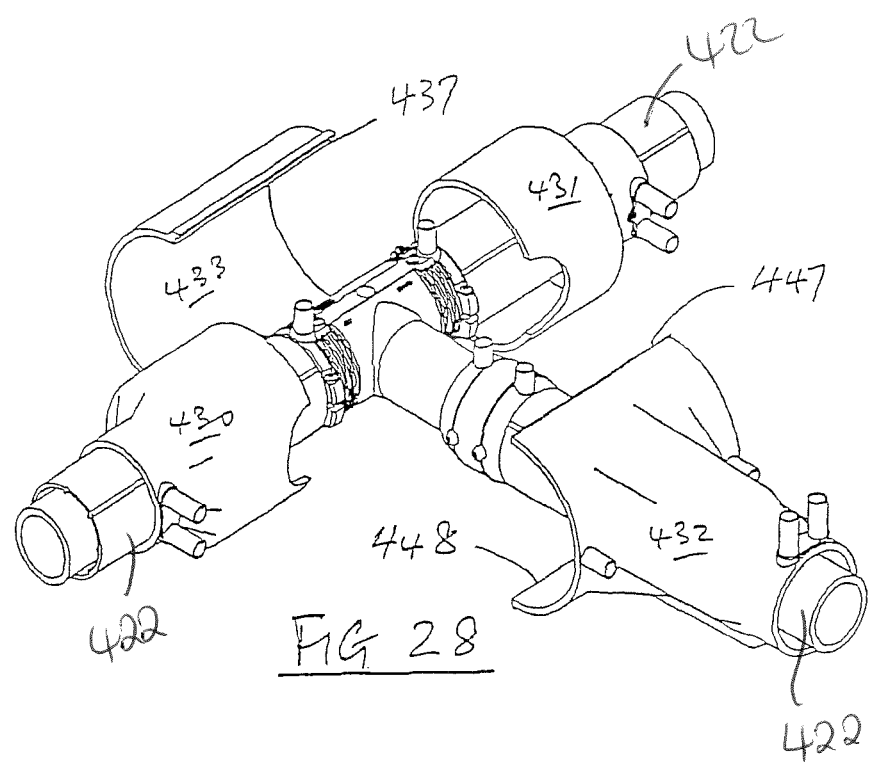
Figure 29:
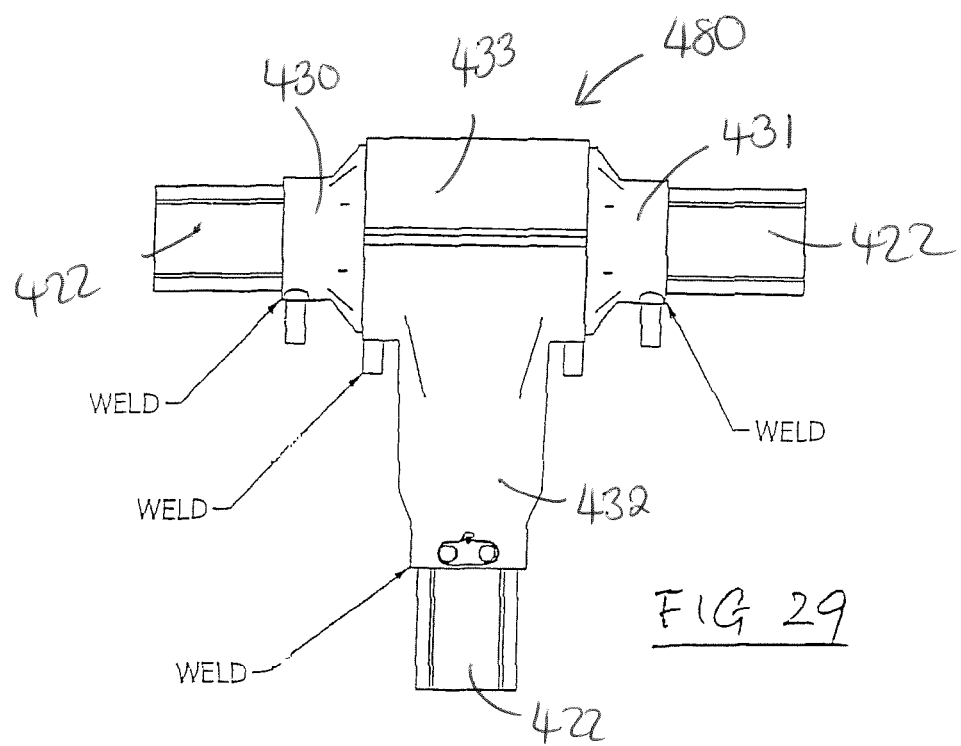

A still further embodiment is illustrated in FIGS. 27, 28 and 29. In this example the coupling assembly comprises four components 430, 431, 432, 433. The inter-engaging flanges 437, 438 are on component 433 and these engage with mating surfaces 447 and 448 on component 432. In use the components 432 and 433 are effectively welded around components 430 and 431 and welded to each other. Although they are shown as two separate components, 432 and 433 may be joined or formed together during manufacture with a so-called living hinge (not shown).

Electrofusion heating elements are provided as necessary, with associated electrical terminals.

A further embodiment is shown in FIGS. 30 and 31. These illustrate a three piece coupling comprising two coupling components 560,570 and a gasket 590. A first end of each coupling component 561,571 has an internal diameter designed to be a tight sliding fit over the external diameter of a pipe (pipe not shown for clarity). The internal or inner surface of the sliding fit diameter first end incorporates an electrical winding heating coil (not shown) and electrical terminals 564,565,574,575 to electrofuse the component onto a pipe in use.

The cross-sectional area of the opening in the second end of each component is larger than that of the opening in first end. This allows space within the assembled coupling to accommodate a coupling around a primary pipe housed within a secondary pipe that is joined using the coupling illustrated in FIGS. 30 and 31. Each component 560,570 has at its second end a flange 567,577, the two flanges being adapted to mate together with gasket 590 in between the flanges. That assembly is completed by passing a plurality of bolts 584 through aligned apertures 562,572,591 and tightening units 581 to an even pressure. The nuts and bolts act as a clamping means to keep the two coupling components together. But it will be understood that any other suitable clamping means could also be used.

The gasket 590 can be formed from any material as selected by the materials specialist. Elastomeric plastics or rubber materials are particularly effective, and preferably plastics or rubber materials that are not adversely affected by petroleum liquids or other fluids being carried by the pipe. Soft metal gaskets may also be used. This list is not intended to be exhaustive but rather to illustrate the broad range of materials that might be used in the construction of a gasket seal.

FIG. 30 illustrates an assembled coupling assembly, designed to join two pipes at an angle of less than 180°.

In a further variation, where the coupling components 560, 570 are formed from an electrofusible plastics material, the gasket 590 may take the form of an electrofusible gasket or electrofusible tape or rope. Assembly is in a similar fashion to that described above except a clamp or clamps are used to hold the two coupling components in the correct spatial orientation during electrofusion, rather than bolts. Once the respective parts have been fused together the clamps can be removed.

The above arrangement of mechanical fixing means and a gasket of some type can be applied and incorporated into any of the coupling assemblies described or claimed herein.

Figure 32:
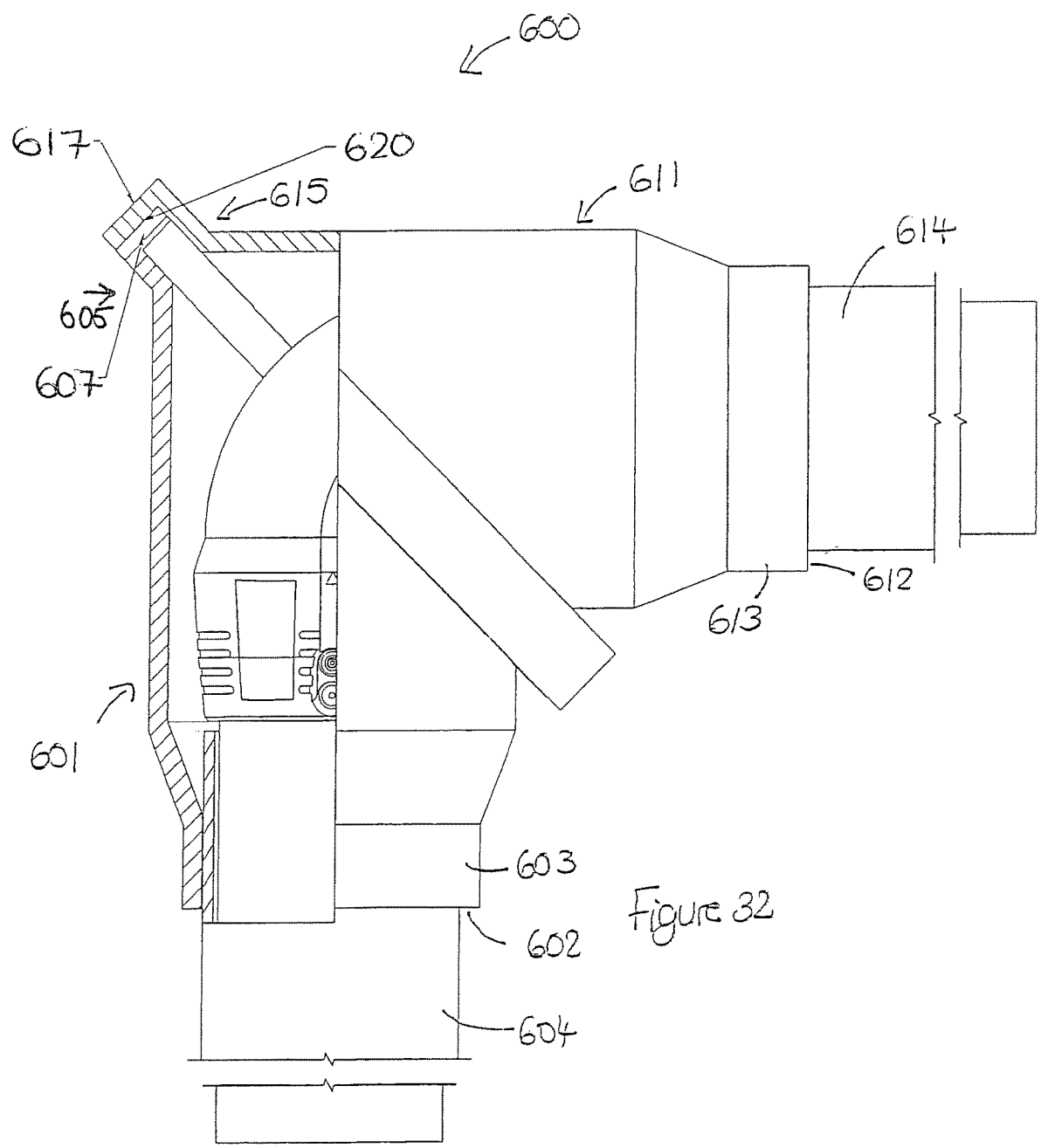
FIGS. 32 and 33 illustrate cut away views of a coupling assembly for an elbow joint according to a further embodiment of the present invention.
Figure 33:
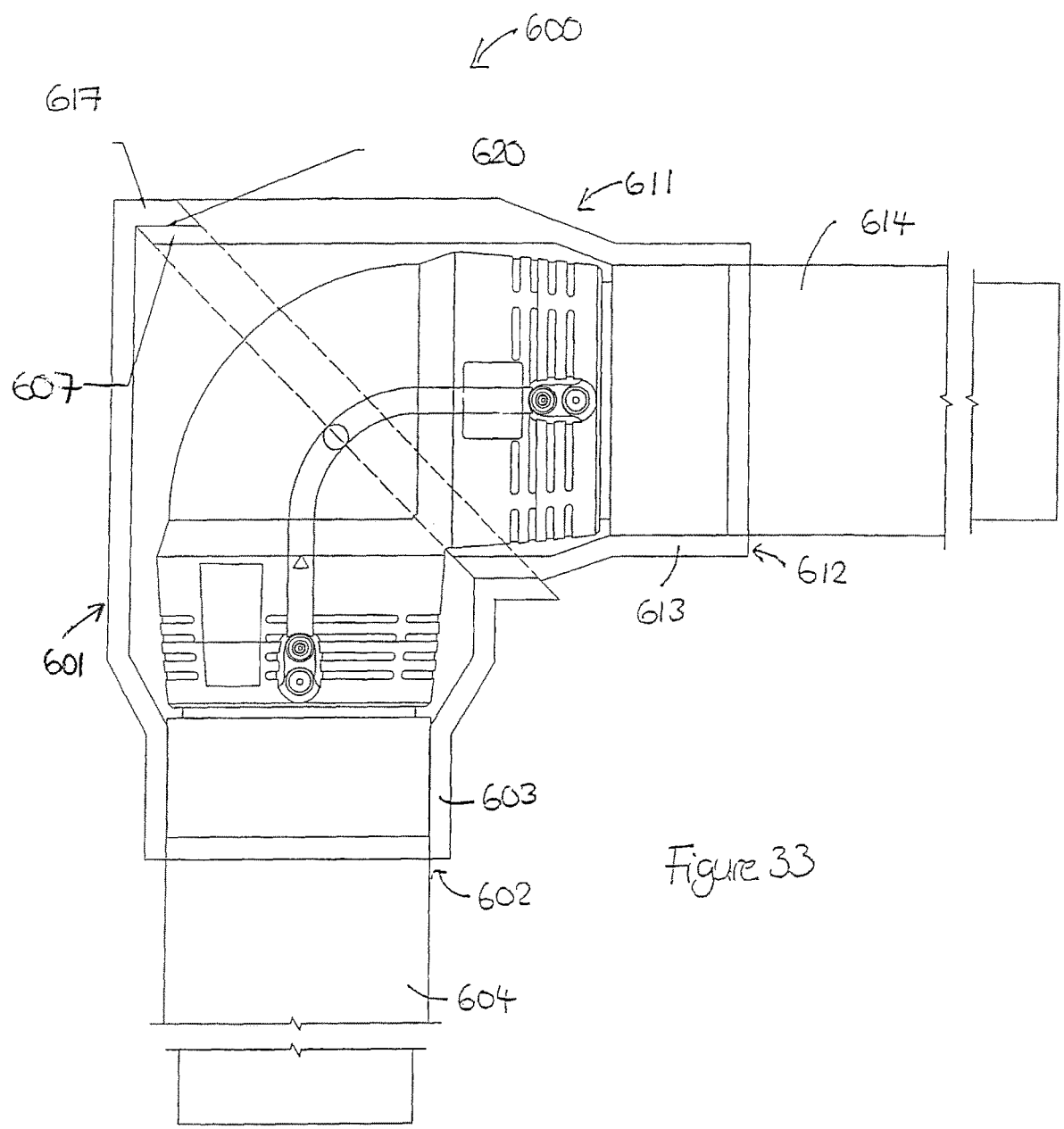
Figure 35A:
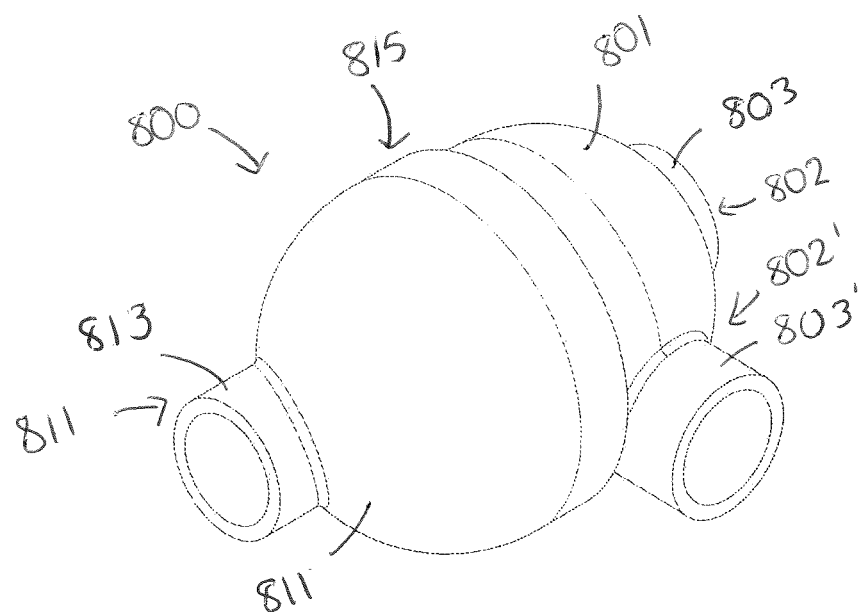
Figure 35B:
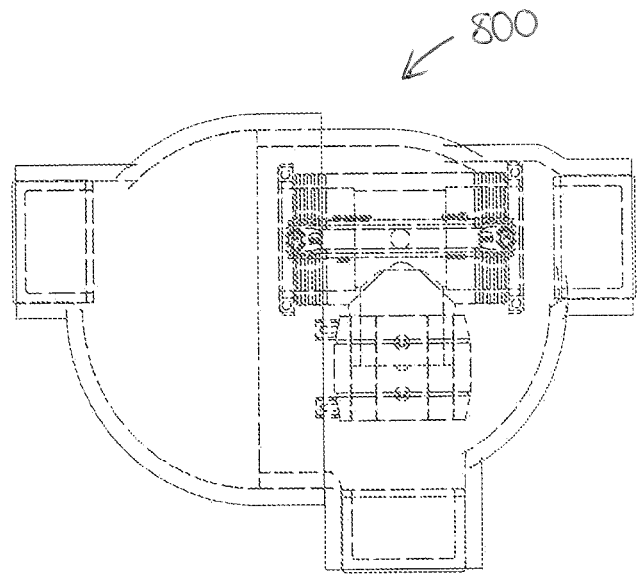
Figure 36A:
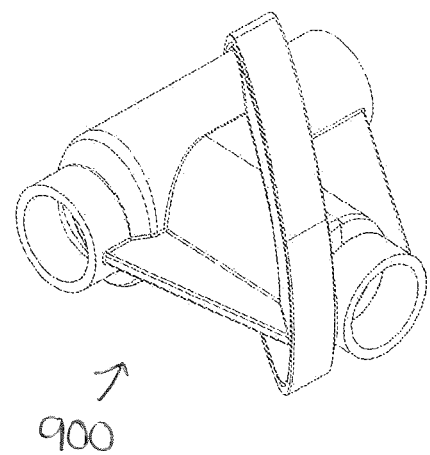
FIGS. 36A to 36D illustrate an alternate construction of T-joint using the same socket and spigot arrangement as in FIG. 34.
Figure 36B:
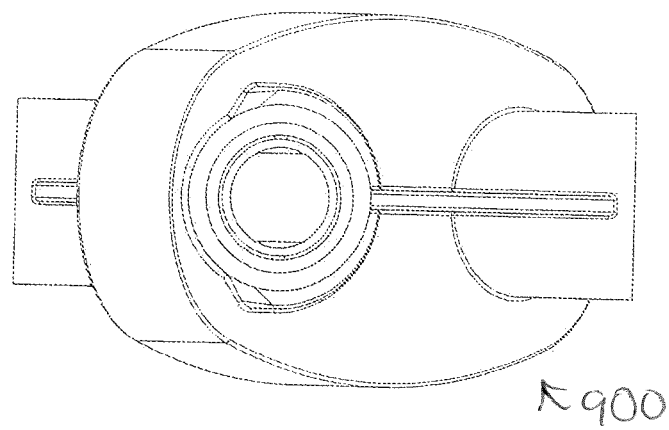
Figure 36C:
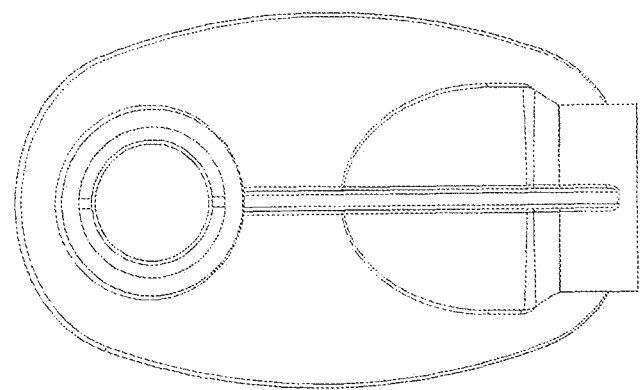
Figure 36D:
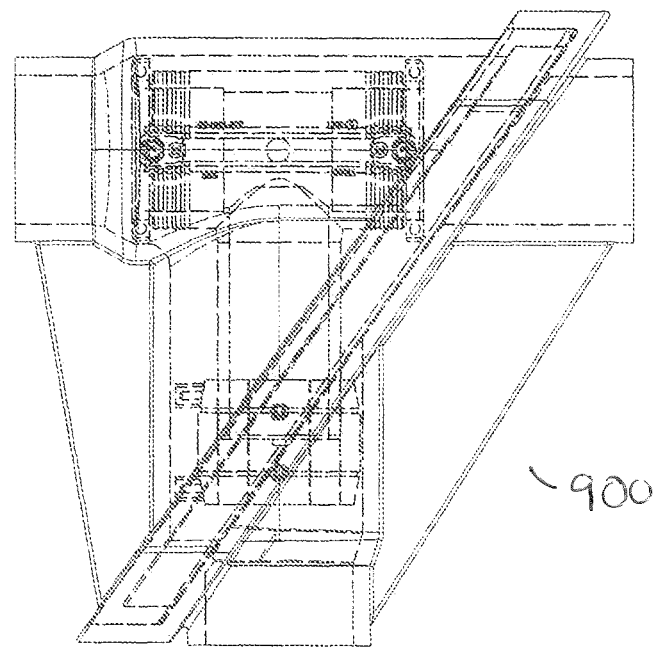
Figure 28:
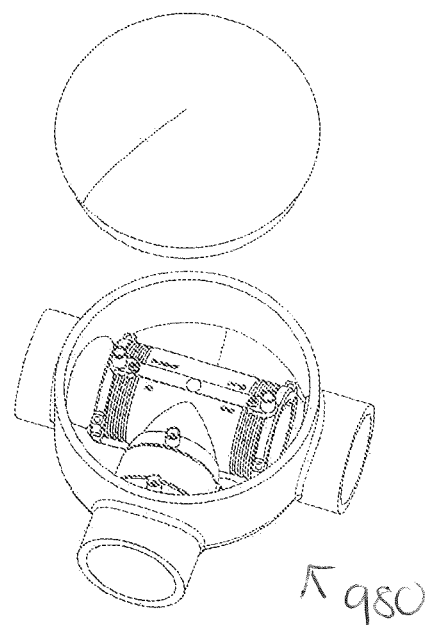
Figure 28:
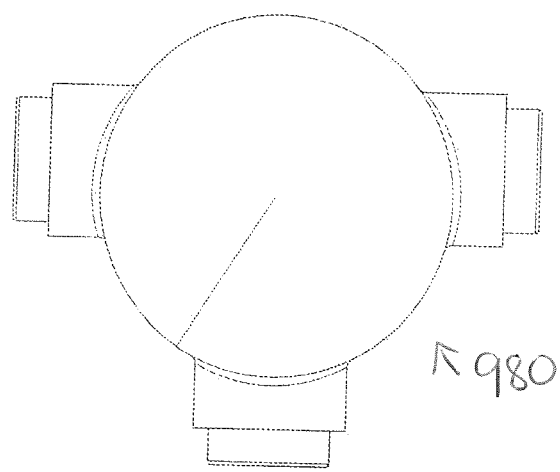
Figure 38C:
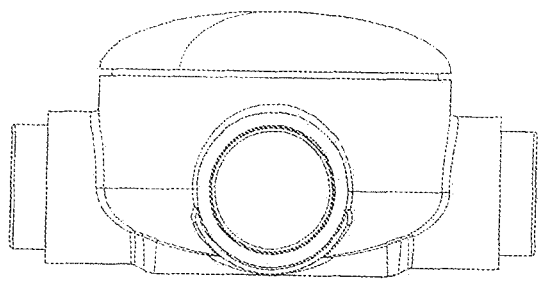
Figure 38D:
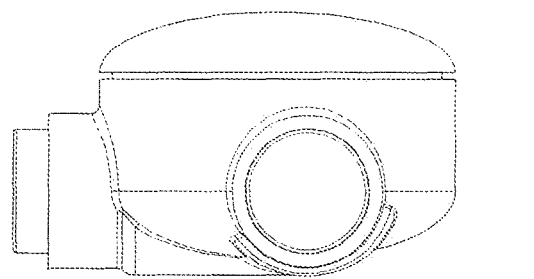
Figure 38E:
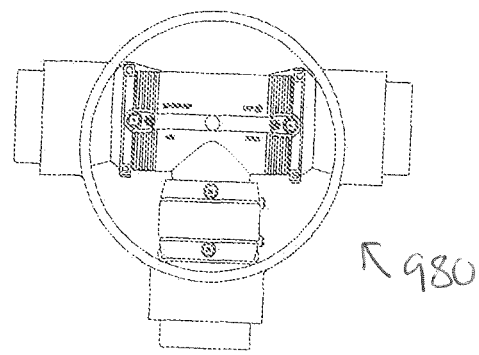

FIGS. 32 and 33 illustrate a further alternative embodiment. FIG. 32 shows an electrofusion coupling including two components in the form of a sliding elbow component 600 wherein the outside of the coupling can be seen with a cross section cutaway portion showing the cross section of the coupling and the primary coupling within the coupling of the present invention. FIG. 33 shows the identical coupling of FIG. 32 but this time transparently showing the primary coupling within the coupling of the present invention. The first component 601 is generally tubular in form having a first end 602 made up of a first tubular portion 603. This first portion has an internal diameter that is designed to be a tight sliding fit over the external diameter of a pipe 604, typically a secondary pipe. The first tubular portion also incorporates an electrical heating element (not shown). This heating element comprises an electrical winding coil located at or near the inner surface of the internal diameter of the first end of the component. Each end of the winding is connected to an electrical terminal connection (not shown). Connection of these terminals to a welding machine and passing electrical current causes the first end of the coupling component to become fused to any pipe that is a sliding fit within that end of the component.

A second end of the coupling component 605, which is generally larger in its inside diameter than the first end, terminates in an end face which includes a mating region in the form of a flange extending axially from and axially in the plane of the end face defining a spigot 607.

The second component 611 is generally tubular in form having a first end 612 made up of a first tubular portion 613. This second portion has an internal diameter that is designed to be a tight sliding fit over the external diameter of a pipe 614, typically a secondary pipe. The second tubular portion also incorporates an electrical heating element (not shown). This heating element comprises an electrical winding coil located at or near the inner surface of the internal diameter of the first end of the component. Each end of the winding is connected to an electrical terminal connection (not shown). Connection of these terminals to a welding machine and passing electrical current causes the first end of the coupling component to become fused to any pipe that is a sliding fit within that end of the component.

A second end of the second coupling component 615, which is generally larger in its inside diameter than the first end, terminates in an end face which includes a mating region in the form of a flange extending axially from and axially in the plane of the end face defining a socket 617.

The spigot 607 of the first component is adapted to nest within the socket 617 of the second component and to form a tight sliding fit there between. A sealing means is provided between the contact faces of the spigot 607 and the socket 617. In the example shown a heating element is provided (not shown). This heating element comprises an electrical winding coil located at or near the inner surface of socket 617 or the external surface of spigot 607. Each end of the winding is connected to an electrical terminal connection (not shown). Connection of these terminals to a welding machine and passing electrical current causes the first coupling component to become fused to the second coupling component in a fluid tight manner to create fusion weld 620.

FIG. 34 illustrates another embodiment of the present invention in a T-joint arrangement utilising the same spigot and socket arrangement as described in detail in FIGS. 32 and 33 above. In this embodiment the coupling 700 includes a first component 701 and a second component 711.

The first component 701 has a first end 702 made up of a first tubular portion 703. This first portion has an internal diameter that is designed to be a tight sliding fit over the external diameter of a pipe 704, typically a secondary pipe. The first tubular portion also incorporates an electrical heating element (not shown). This heating element comprises an electrical winding coil located at or near the inner surface of the internal diameter of the first end of the component. Each end of the winding is connected to an electrical terminal connection (not shown). Connection of these terminals to a welding machine and passing electrical current causes the first end of the coupling component to become fused to any pipe that is a sliding fit within that end of the component.

The first component 701 has a second end 702' made up of a first tubular portion 703'. This first portion has an internal diameter that is designed to be a tight sliding fit over the external diameter of a pipe 704', typically a secondary pipe. The first tubular portion also incorporates an electrical heating element (not shown). This heating element comprises an electrical winding coil located at or near the inner surface of the internal diameter of the first end of the component. Each end of the winding is connected to an electrical terminal connection (not shown). Connection of these terminals to a welding machine and passing electrical current causes the first end of the coupling component to become fused to any pipe that is a sliding fit within that end of the component.

A third end of the coupling component 705, which is generally larger in its inside diameter than the first end, terminates in an end face which includes a mating region in the form of a flange extending axially from and axially in the plane of the end face defining a socket 707.

The second component 711 is generally tubular in form having a first end 712 made up of a first tubular portion 713. This second portion has an internal diameter that is designed to be a tight sliding fit over the external diameter of a pipe 714, typically a secondary pipe. The second tubular portion also incorporates an electrical heating element (not shown). This heating element comprises an electrical winding coil located at or near the inner surface of the internal diameter of the first end of the component. Each end of the winding is connected to an electrical terminal connection (not shown). Connection of these terminals to a welding machine and passing electrical current causes the first end of the coupling component to become fused to any pipe that is a sliding fit within that end of the component.

A second end of the second coupling component 715, which is generally larger in its inside diameter than the first end, terminates in an end face which includes a mating region in the form of a flange extending axially from and axially in the plane of the end face defining a spigot 717.

The socket 707 of the first component is adapted to nest within the spigot 717 of the second component and to form a tight sliding fit there between. A sealing means is provided between the contact faces of the socket 707 and the spigot 717. In the example shown a heating element is provided (not shown). This heating element comprises an electrical winding coil located at or near the external surface of spigot 717 or the internal surface of socket 707. Each end of the winding is connected to an electrical terminal connection (not shown). Connection of these terminals to a welding machine and passing electrical current causes the first coupling component to become fused to the second coupling component in a fluid tight manner to create fusion weld 720.

FIGS. 35A to 35D, 36A to 36D, 37A to 37D and 38A to 38E illustrate alternate constructions of T-joints using the same socket and spigot arrangement as discussed in detail in relation to FIG. 34 above. For example, coupling 950 contains components, including components defining a socket and spigot analogous to socket 617 and spigot 607, described in detail in FIGS. 32 and 33, which in turn use the same socket and spigot arrangement of FIG. 34 as noted above.

It will be appreciate that the aspects of the different embodiments described above are not exclusive to any particular embodiment and aspects of one embodiment may be used in combination with aspects of another embodiment.

It will be appreciated that aspects of the present invention include methods of manufacturing components and couplings according to the present invention, methods of forming joints using such components and couplings and pipework systems including such joints and couplings.

Couplings according to the present invention can be constructed from any suitable plastics material as determined by the materials specialist. Typically they are formed from a group including thermoplastic polymers such as but in no way limited to:—

Polyethylene
Polypropylene
Polyvinyl chloride
Fluoropolymers including tetrafluoropolyethylene
Nylon 612
Polyamides
Polyamides 6, 11 or 12
Polyethylene terephthalate
Polyvinylidene chloride or fluoride
Ethylene/vinyl alcohol copolymers or mixtures of any of the above.

The invention claimed is:

1. A coupling assembly for forming a joint between a first secondary pipe section, a second secondary pipe section, and a third secondary pipe section, the coupling assembly accommodating a primary joint therein, in a secondary containment system, the coupling assembly comprising:

a first coupling component having a first pipe-fit end, a second pipe-fit end, and a first joint end, the first coupling component having a first longitudinal axis between the first pipe-fit end and the first joint end, and a second longitudinal axis between the second pipe-fit end and the first joint end, the first pipe-fit end of the first coupling component including a first tubular portion having a first internal diameter sized and shaped to receive the first secondary pipe section, and a first sealer positioned such that the first pipe-fit end can be sealed in use to the first secondary pipe section;

the second pipe-fit end of the first coupling component including a second tubular portion having a second internal diameter sized and shaped to receive the second secondary pipe section, and a second sealer positioned such that the second pipe-fit end can be sealed in use to the second secondary pipe section; and the first joint end of the first coupling component having a third internal diameter which is larger than the first internal diameter and the second internal diameter, and wherein the first joint end incorporates a first end face, wherein the first end face is in a plane that is at least one of substantially non-perpendicular to, and offset from, both the first longitudinal axis and the second longitudinal axis, and wherein the first joint end further includes a first mating region; and a second coupling component having a third pipe-fit end and a second joint end, the second coupling component having a third longitudinal axis arranged at an angle relative to at least one of the first longitudinal axis and the second longitudinal axis, the third pipe-fit end including a third tubular portion having a third internal diameter sized and shaped to form a sliding fit with the third secondary pipe section, and a third sealer positioned such that the third end can be sealed in use to the third secondary pipe section; and the second joint end of the second coupling component having a fourth internal diameter larger than the third internal diameter, and wherein the second joint end incorporates a second end face, wherein the second end face is in a plane that is at least one of substantially non-perpendicular to, and offset from, the third longitudinal axis, and wherein the second joint end further includes a second mating region sized and shaped to be sealed to the first mating region of the first coupling component.

2. A coupling assembly according to claim 1 wherein the second mating region extends from the second end face.

3. A coupling assembly according to claim 1 wherein the second mating region includes a flange.

4. A coupling assembly according to claim 3 wherein the flange extends radially from the plane of the second end face to define an annular portion or ring.

5. A coupling assembly according to claim 4 wherein the second end face includes both the second mating region and the flange such that the flange is an extension of the second end face.

6. A coupling assembly according to claim 3 wherein the flange extends axially from the plane of the second end face to define a cylindrical portion or ring.

7. A coupling assembly according to claim 6 wherein the flange defines a socket.

8. A coupling assembly according to claim 6 wherein the flange defines a spigot.

9. A coupling assembly according to claim 1 further including a mating seal sized and shaped to seal in use the first coupling component to the second coupling component.

10. A coupling assembly according to claim 1 wherein the first end face at the first joint end of the first coupling component is in a plane at substantially 45° to at least one of the first longitudinal axis and the second longitudinal axis of the first coupling component.

11. A coupling assembly according to claim 1 in which the assembly is generally tubular in configuration.

12. A coupling assembly according to claim 1 wherein the first pipe-fit end is in a plane substantially perpendicular to the first longitudinal axis of the first coupling component.

13. A coupling assembly as claimed in claim 1 wherein the first joint end is non-circular in cross-section.

14. A coupling assembly as claimed in claim 13 wherein the first joint end is substantially oval in shape.

15. A coupling assembly as claimed in claim 1 wherein the first sealer is selected from the group including:
   (i) an electrofusion heating element and associated electrical terminal connections;
   (ii) a bond or weld including a chemical bond or weld, an ultrasonic weld or a heat weld;
   (iii) a gasket seal together with a clamp; or a combination thereof.

16. A coupling assembly as claimed in claim 1 wherein at least one of the first mating region and the second mating region includes an electrofusion heating element and electrical terminal connections.

17. The coupling assembly according to claim 1, wherein the angle formed by the third longitudinal axis, and the second longitudinal axis is substantially 90°.

* * * * *